United States Patent
Mashiki

(10) Patent No.: US 7,448,981 B2
(45) Date of Patent: Nov. 11, 2008

(54) POWER OUTPUT APPARATUS, VEHICLE EQUIPPED WITH POWER OUTPUT APPARATUS, AND CONTROL METHOD OF POWER OUTPUT APPARATUS

(75) Inventor: Zenichiro Mashiki, Aichi-ken (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 323 days.

(21) Appl. No.: 11/474,324

(22) Filed: Jun. 26, 2006

(65) Prior Publication Data
US 2006/0289211 A1 Dec. 28, 2006

(30) Foreign Application Priority Data
Jun. 27, 2005 (JP) ............................. 2005-186678

(51) Int. Cl.
*B60K 1/02* (2006.01)
(52) U.S. Cl. ............... 477/3; 477/2; 477/5; 180/65.2; 180/65.4; 180/65.7; 123/431; 60/285
(58) Field of Classification Search ........ 477/2, 477/3, 5; 180/65.2, 65.4, 65.7; 290/40 C; 123/295, 299, 300, 305, 430, 431; 60/284, 60/285, 286, 274
See application file for complete search history.

(56) References Cited
U.S. PATENT DOCUMENTS
7,059,116 B2 * 6/2006 Kusada et al. ................. 60/285
7,249,454 B2 * 7/2007 Ichise et al. ................... 60/285
2003/0051692 A1 3/2003 Mizutani

FOREIGN PATENT DOCUMENTS

| JP | A 7-103051 | 4/1995 |
|---|---|---|
| JP | A 8-135777 | 5/1996 |
| JP | A 8-193535 | 7/1996 |
| JP | A 2000-052817 | 2/2000 |
| JP | A 2001-020837 | 1/2001 |
| JP | A 2006-161783 | 6/2006 |

* cited by examiner

*Primary Examiner*—David D. Le
(74) *Attorney, Agent, or Firm*—Oliff & Berridge, PLC

(57) ABSTRACT

The drive control of the invention sets a rotation speed Ni for in-cylinder injection according to an operation curve used in operation of an engine with fuel injection from only in-cylinder fuel injection valves and a rotation speed Np for port injection according to an operation curve used in operation of the engine with fuel injection from only port fuel injection valves (steps S150 and S160). The drive control subsequently sets a target rotation speed Ne* and a target torque Te* of the engine by distributing the rotation speed Ni for in-cylinder injection and the rotation speed Np for port injection by an allocation rate k of in-cylinder fuel injection to port fuel injection (step S170). The drive control then sets torque commands Tm1* and Tm2* of two motors and controls the engine and the two motors to drive the engine at a specific drive point defined by the target rotation speed Ne* and the target torque Te* and to ensure output of a torque demand Tr* to a ring gear shaft or a driveshaft (steps S180 through S220). This arrangement attains efficient and appropriate operation of the engine.

19 Claims, 10 Drawing Sheets

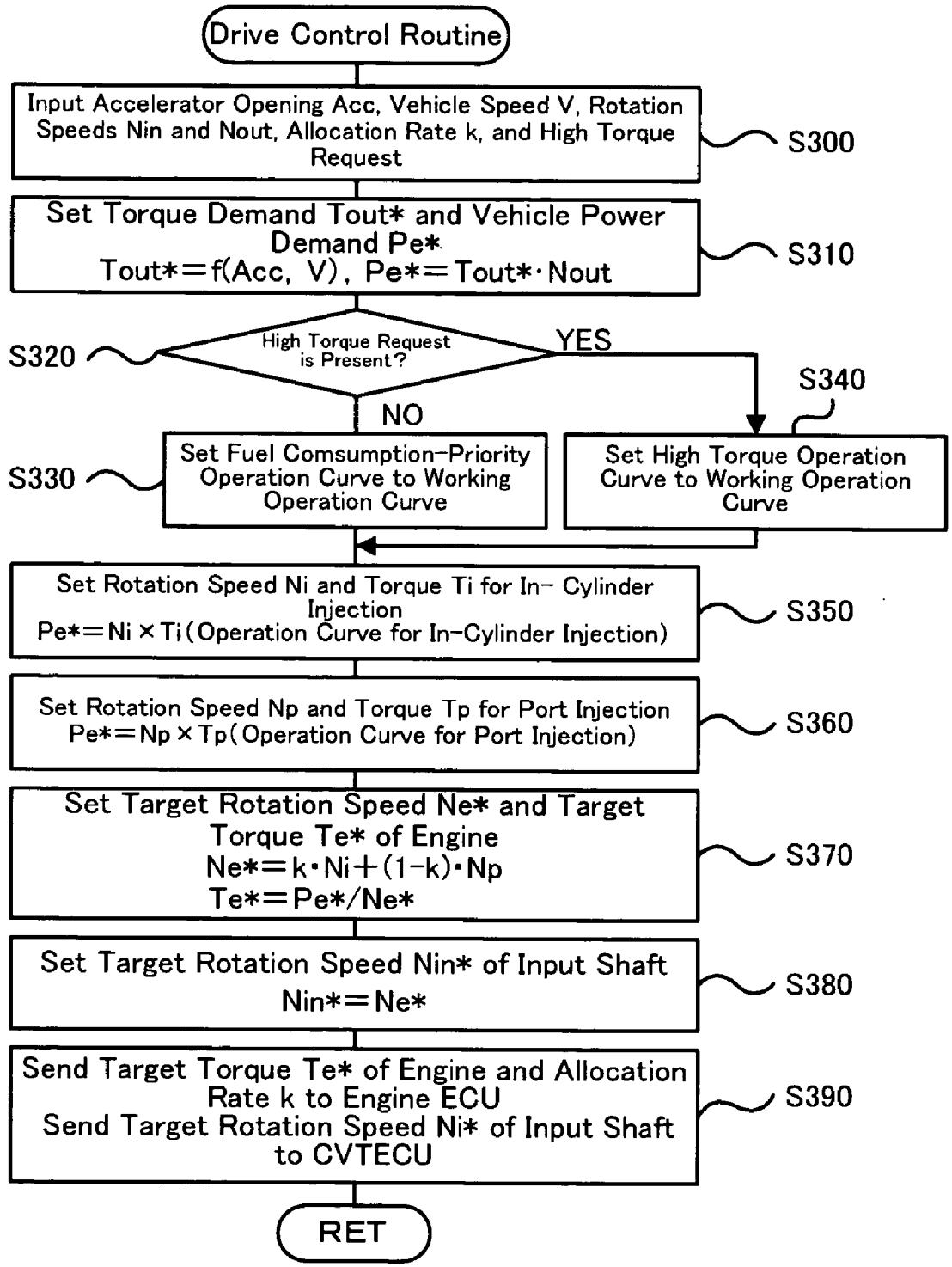

POWER OUTPUT APPARATUS, VEHICLE EQUIPPED WITH POWER OUTPUT APPARATUS, AND CONTROL METHOD OF POWER OUTPUT APPARATUS

BACKGROUND OF THE INVENTION

1. Field of the Invention

The present invention relates to a power output apparatus, a vehicle equipped with the power output apparatus, and a control method of the power output apparatus.

2. Description of the Prior Art

One proposed power output apparatus to be mounted on a vehicle has an engine with in-cylinder fuel injection valves for injecting the fuel into cylinders and a toroidal continuously variable transmission (see, for example, Japanese Patent Laid-Open Gazette No. 2000-52817). This power output apparatus sets a target torque of the engine and a target input shaft rotation speed of the transmission, based on the driving state of the vehicle and a target driving force that varies with a variation in driving state. The target torque of the engine and the target input shaft rotation speed of the transmission vary according to the state of combustion, which reflects a variation in air-fuel ratio of the air-fuel mixture supplied to the engine. The engine and the continuously variable transmission are controlled with allocation of a driving force defined by the target torque of the engine and the target input shaft rotation speed of the transmission. Such control aims to drive the engine under the operating conditions of the optimum fuel consumption.

Another proposed power output apparatus has an engine with both in-cylinder fuel injection valves for injecting the fuel into cylinders and port fuel injection valves for injecting the fuel in an intake port (see, for example, Japanese Patent Laid-Open Gazette No. 2001-20837). This proposed power output apparatus sets 0 to a share of fuel injection from the port fuel injection valves in a stratification range and increases the share of fuel injection from the port fuel injection valves in a homogeneous range with an increase in rotation speed of the engine and with an increase in engine loading. Such control aims to enhance the combustion performance in the stratification range and to attain the appropriate combustion performance in the homogeneous range.

SUMMARY OF THE INVENTION

In the engine with both the in-cylinder fuel injection valves and the port fuel injection valves, the allocation rate of fuel injection from the in-cylinder fuel injection valves to fuel injection from the port fuel injection valves is varied according to the engine rotation speed and the engine loading. Varying the allocation rate of fuel injection is expected to enhance the efficiency and the performances of the engine. A simple variation in allocation rate of fuel injection, however, does not attain the sufficient effects on efficiency and performance improvement. The engine is operable with high efficiency at a high-efficient drive point, which is one of multiple drive points outputting an identical power. The high-efficient drive point of the engine operated with fuel injection from only the in-cylinder fuel injection valves is often different from the high-efficient drive point of the engine operated with fuel injection from only the port fuel injection valves. In the operation of the engine with the varying allocation rate of fuel injection from the in-cylinder fuel injection valves to fuel injection from the port fuel injection valves, the operation efficiency of the engine depends upon the drive point of the engine. The engine is driven with a change in drive point among the multiple drive points outputting an identical power. For example, the engine is driven at the high-efficient drive point under some conditions and at a high torque drive point for output of a higher torque under other conditions. In such cases, it is desirable to determine the optimum drive point of the engine by taking into account the change in drive point.

The power output apparatus of the invention, the vehicle equipped with the power output apparatus, and the control method of the power output apparatus thus aim to attain efficient operation of an internal combustion engine with shared fuel injection from in-cylinder fuel injection valves and from port fuel injection valves at a specified allocation rate. The power output apparatus of the invention, the vehicle equipped with the power output apparatus, and the control method of the power output apparatus also aim to attain appropriate operation of the internal combustion engine with shared fuel injection from the in-cylinder fuel injection valves and from the port fuel injection valves at a specified allocation rate.

In order to attain at least part of the above and the other related objects, the power output apparatus of the invention, the vehicle equipped with the power output apparatus, and the control method of the power output apparatus have the configurations discussed below.

The present invention is directed to a power output apparatus that outputs power to a driveshaft. The power output apparatus including: an internal combustion engine that outputs power and has an in-cylinder fuel injection valve for injecting a fuel into a cylinder and a port fuel injection valve for injecting the fuel in an intake port; a torque conversion unit that converts the output power of the internal combustion engine by torque conversion and transmits the converted power to the driveshaft; a target driving force setting module that sets a target driving force to be output to the driveshaft; a target power setting module that sets a target power to be output from the internal combustion engine, based on the set target driving force; a target operating state setting module that sets a target operating state of the internal combustion engine, based on the set target power, a specified allocation rate of fuel injection from the in-cylinder fuel injection valve to fuel injection from the port fuel injection valve, a first constraint, and a second constraint, where the first constraint is imposed on an operating state of the internal combustion engine with shared fuel injection from the in-cylinder fuel injection valve and from the port fuel injection valve at a predetermined first allocation rate, and the second constraint is imposed on the operating state of the internal combustion engine with shared fuel injection from the in-cylinder fuel injection valve and from the port fuel injection valve at a predetermined second allocation rate different from the first allocation rate; and a control module that controls the internal combustion engine and the torque conversion unit to drive the internal combustion engine in the target operating state with fuel injection at the specified allocation rate and to ensure output of the target driving force to the driveshaft.

The power output apparatus of the invention sets the target power to be output from the internal combustion engine, based on the target driving force to be output to the driveshaft. The power output apparatus subsequently sets the target operating state of the internal combustion engine, based on the set target power, the specified allocation rate of fuel injection from the in-cylinder fuel injection valve to fuel injection from the port fuel injection valve, the first constraint, and the second constraint. Here the first constraint is imposed on the operating state of the internal combustion engine with shared fuel injection from the in-cylinder fuel injection valve and from the port fuel injection valve at the predetermined first allocation rate. The second constraint is imposed on the operating state of the internal combustion engine with shared fuel injection from the in-cylinder fuel injection valve and from the port fuel injection valve at the predetermined second allocation rate different from the first allocation rate. The power output apparatus then controls the internal combustion engine and the torque conversion unit to drive the internal combustion engine in the target operating state with fuel injection at the specified allocation rate and to ensure output of the target driving force to the driveshaft. Namely the target operating state of the internal combustion engine is set according to the target power to be output from the internal combustion engine, the specified allocation rate of fuel injection from the in-cylinder fuel injection valve to fuel injection from the port fuel injection valve, the first constraint imposed on the operating state of the internal combustion engine at the predetermined first allocation rate, and the second constraint imposed on the operating state of the internal combustion engine at the predetermined second allocation rate. The control of the internal combustion engine and the torque conversion unit enables operation of the internal combustion engine in the target operating state and ensures output of the target driving force to the driveshaft. The internal combustion engine is driven in the target operating state, which is set according to the specified allocation rate of fuel injection from the in-cylinder fuel injection valve to fuel injection from the port fuel injection valve. This arrangement attains efficient and appropriate operation of the internal combustion engine with shared fuel injection from the in-cylinder fuel injection valve and from the port fuel injection valve at the specified allocation rate.

In one preferable embodiment of the power output apparatus of the invention, the target operating state setting module sets the target operating state of the internal combustion engine by distributing a first operating state and a second operating state of the internal combustion engine by a ratio of the specified allocation rate to the predetermined first allocation rate and a ratio of the specified allocation rate to the predetermined second allocation rate, where the first operating state of the internal combustion engine is set based on the first constraint and the target power and the second operating state of the internal combustion engine is set based on the second constraint and the target power. In this embodiment, the first operating state and the second operating state are distributed according to the ratio of the specified allocation rate to the predetermined first allocation rate and the ratio of the specified allocation rate to the predetermined second allocation rate. This arrangement sets an optimum operating state between the first operating state and the second operating state to the target operating state and drives the internal combustion engine in the target operating state. This attains efficient and appropriate operation of the internal combustion engine.

In another preferable embodiment of the power output apparatus of the invention, each of the first constraint and the second constraint includes multiple restrictions with regard to multiple conditions. The target operating state setting module sets the target operating state of the internal combustion engine, based on a certain restriction included in the first constraint and a corresponding restriction included in the second constraint with regard to a selected condition among the multiple conditions. When the internal combustion engine is driven with the multiple restrictions, the arrangement of this embodiment ensures appropriate operation of the internal combustion engine with the restrictions under the selected condition. The multiple restrictions may include at least one of an efficient operation restriction for efficient operation of the internal combustion engine and a high torque output restriction for output of a high torque from the internal combustion engine.

In still another preferable embodiment of the power output apparatus of the invention, the first constraint regards operation of the internal combustion engine with fuel injection from only the in-cylinder fuel injection valve, and the second constraint regards operation of the internal combustion engine with fuel injection from only the port fuel injection valve. The operation of the internal combustion engine is thus controllable with the restriction imposed on the operation of the internal combustion engine with fuel injection from only the in-cylinder fuel injection valve and with the restriction imposed on the operation of the internal combustion engine with fuel injection from only the port fuel injection valve.

In one preferable embodiment of the power output apparatus of the invention, the torque conversion unit is a continuously variable transmission, and the control module varies a change gear ratio of the torque conversion unit to drive and rotate the internal combustion engine at a rotation speed specified by the set target operating state.

In another preferable embodiment of the power output apparatus of the invention, the torque conversion unit includes: an electric power-mechanical power input output mechanism that is connected to an output shaft of the internal combustion engine and to the driveshaft and outputs at least part of the output power of the internal combustion engine to the driveshaft through input and output of electric power and mechanical power; a motor that inputs and outputs power from and to the driveshaft; and an accumulator unit that receives and transmits electric power from and to the electric power-mechanical power input output mechanism and the motor. The control module controls the internal combustion engine, the electric power-mechanical power input output mechanism, and the motor to drive the internal combustion engine in the target operating state and to ensure output of a driving force equivalent to the target driving force to the driveshaft. The electric power-mechanical power input output mechanism may includes: a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

The present invention is also directed to a vehicle. The vehicle comprising: an internal combustion engine that outputs power and has an in-cylinder fuel injection valve for injecting a fuel into a cylinder and a port fuel injection valve for injecting the fuel in an intake port; a torque conversion unit that converts the output power of the internal combustion engine by torque conversion and transmits the converted power to the driveshaft connected to an axle; a target driving force setting module that sets a target driving force to be output to the driveshaft; a target power setting module that sets a target power to be output from the internal combustion engine, based on the set target driving force; a target operating state setting module that sets a target operating state of the internal combustion engine, based on the set target power, a specified allocation rate of fuel injection from the in-cylinder fuel injection valve to fuel injection from the port fuel injection valve, a first constraint, and a second constraint, where the first constraint is imposed on an operating state of the internal combustion engine with shared fuel injection from the in-cylinder fuel injection valve and from the port fuel injection valve at a predetermined first allocation rate, and the second constraint is imposed on the operating state of the internal combustion engine with shared fuel injection from the in-cylinder fuel injection valve and from the port fuel injection valve at a predetermined second allocation rate different from the first allocation rate; and a control module that controls the internal combustion engine and the torque conversion unit to drive the internal combustion engine in the target operating state with fuel injection at the specified allocation rate and to ensure output of the target driving force to the driveshaft.

The vehicle of the invention sets the target power to be output from the internal combustion engine, based on the target driving force to be output to the driveshaft. The vehicle subsequently sets the target operating state of the internal combustion engine, based on the set target power, the specified allocation rate of fuel injection from the in-cylinder fuel injection valve to fuel injection from the port fuel injection valve, the first constraint, and the second constraint. Here the first constraint is imposed on the operating state of the internal combustion engine with shared fuel injection from the in-cylinder fuel injection valve and from the port fuel injection valve at the predetermined first allocation rate. The second constraint is imposed on the operating state of the internal combustion engine with shared fuel injection from the in-cylinder fuel injection valve and from the port fuel injection valve at the predetermined second allocation rate different from the first allocation rate. The vehicle then controls the internal combustion engine and the torque conversion unit to drive the internal combustion engine in the target operating state with fuel injection at the specified allocation rate and to ensure output of the target driving force to the driveshaft. Namely the target operating state of the internal combustion engine is set according to the target power to be output from the internal combustion engine, the specified allocation rate of fuel injection from the in-cylinder fuel injection valve to fuel injection from the port fuel injection valve, the first constraint imposed on the operating state of the internal combustion engine at the predetermined first allocation rate, and the second constraint imposed on the operating state of the internal combustion engine at the predetermined second allocation rate. The control of the internal combustion engine and the torque conversion unit enables operation of the internal combustion engine in the target operating state and ensures output of the target driving force to the driveshaft. The internal combustion engine is driven in the target operating state, which is set according to the specified allocation rate of fuel injection from the in-cylinder fuel injection valve to fuel injection from the port fuel injection valve. This arrangement attains efficient and appropriate operation of the internal combustion engine with shared fuel injection from the in-cylinder fuel injection valve and from the port fuel injection valve at the specified allocation rate.

In one preferable embodiment of the vehicle of the invention, the target operating state setting module sets the target operating state of the internal combustion engine by distributing a first operating state and a second operating state of the internal combustion engine by a ratio of the specified allocation rate to the predetermined first allocation rate and a ratio of the specified allocation rate to the predetermined second allocation rate, where the first operating state of the internal combustion engine is set based on the first constraint and the target power and the second operating state of the internal combustion engine is set based on the second constraint and the target power. In this embodiment, the first operating state and the second operating state are distributed according to the ratio of the specified allocation rate to the predetermined first allocation rate and the ratio of the specified allocation rate to the predetermined second allocation rate. This arrangement sets an optimum operating state between the first operating state and the second operating state to the target operating state and drives the internal combustion engine in the target operating state. This attains efficient and appropriate operation of the internal combustion engine.

In another preferable embodiment of the vehicle of the invention, each of the first constraint and the second constraint includes multiple restrictions with regard to multiple conditions. The target operating state setting module sets the target operating state of the internal combustion engine, based on a certain restriction included in the first constraint and a corresponding restriction included in the second constraint with regard to a selected condition among the multiple conditions. When the internal combustion engine is driven with the multiple restrictions, the arrangement of this embodiment ensures appropriate operation of the internal combustion engine with the restrictions under the selected condition.

In still another preferable embodiment of the vehicle of the invention, the first constraint regards operation of the internal combustion engine with fuel injection from only the in-cylinder fuel injection valve, and the second constraint regards operation of the internal combustion engine with fuel injection from only the port fuel injection valve. The operation of the internal combustion engine is thus controllable with the restriction imposed on the operation of the internal combustion engine with fuel injection from only the in-cylinder fuel injection valve and with the restriction imposed on the operation of the internal combustion engine with fuel injection from only the port fuel injection valve.

In one preferable embodiment of the vehicle of the invention, the torque conversion unit is a continuously variable transmission, and the control module varies a change gear ratio of the torque conversion unit to drive and rotate the internal combustion engine at a rotation speed specified by the set target operating state.

In another preferable embodiment of the vehicle of the invention, the torque conversion unit includes: an electric power-mechanical power input output mechanism that is connected to an output shaft of the internal combustion engine and to the driveshaft and outputs at least part of the output power of the internal combustion engine to the driveshaft through input and output of electric power and mechanical power; a motor that inputs and outputs power from and to the driveshaft; and an accumulator unit that receives and transmits electric power from and to the electric power-mechanical power input output mechanism and the motor. The control module controls the internal combustion engine, the electric power-mechanical power input output mechanism, and the motor to drive the internal combustion engine in the target operating state and to ensure output of a driving force equivalent to the target driving force to the driveshaft. In this embodiment of the vehicle of the invention, the electric power-mechanical power input output mechanism includes: a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

The present invention is directed to a control method of a power output apparatus. The power output apparatus including: an internal combustion engine that outputs power and has an in-cylinder fuel injection valve for injecting a fuel into a cylinder and a port fuel injection valve for injecting the fuel in an intake port; and a torque conversion unit that converts the output power of the internal combustion engine by torque conversion and transmits the converted power to a driveshaft. The control method including the steps of: (a) setting a target driving force to be output to the driveshaft, and setting a target power to be output from the internal combustion engine based on the set target driving force; (b) setting a target operating state of the internal combustion engine, based on the set target power, a specified allocation rate of fuel injection from the in-cylinder fuel injection valve to fuel injection from the port fuel injection valve, a first constraint, and a second constraint, where the first constraint is imposed on an operating state of the internal combustion engine with shared fuel injection from the in-cylinder fuel injection valve and from the port fuel injection valve at a predetermined first allocation rate, and the second constraint is imposed on the operating state of the internal combustion engine with shared fuel injection from the in-cylinder fuel injection valve and from the port fuel injection valve at a predetermined second allocation rate different from the first allocation rate; and (c) controlling the internal combustion engine and the torque conversion unit to drive the internal combustion engine in the target operating state with fuel injection at the specified allocation rate and to ensure output of the target driving force to the driveshaft.

The control method of the power output apparatus of the invention sets the target power to be output from the internal combustion engine, based on the target driving force to be output to the driveshaft. The power output apparatus subsequently sets the target operating state of the internal combustion engine, based on the set target power, the specified allocation rate of fuel injection from the in-cylinder fuel injection valve to fuel injection from the port fuel injection valve, the first constraint, and the second constraint. Here the first constraint is imposed on the operating state of the internal combustion engine with shared fuel injection from the in-cylinder fuel injection valve and from the port fuel injection valve at the predetermined first allocation rate. The second constraint is imposed on the operating state of the internal combustion engine with shared fuel injection from the in-cylinder fuel injection valve and from the port fuel injection valve at the predetermined second allocation rate different from the first allocation rate. The power output apparatus then controls the internal combustion engine and the torque conversion unit to drive the internal combustion engine in the target operating state with fuel injection at the specified allocation rate and to ensure output of the target driving force to the driveshaft. Namely the target operating state of the internal combustion engine is set according to the target power to be output from the internal combustion engine, the specified allocation rate of fuel injection from the in-cylinder fuel injection valve to fuel injection from the port fuel injection valve, the first constraint imposed on the operating state of the internal combustion engine at the predetermined first allocation rate, and the second constraint imposed on the operating state of the internal combustion engine at the predetermined second allocation rate. The control of the internal combustion engine and the torque conversion unit enables operation of the internal combustion engine in the target operating state and ensures output of the target driving force to the driveshaft. The internal combustion engine is driven in the target operating state, which is set according to the specified allocation rate of fuel injection from the in-cylinder fuel injection valve to fuel injection from the port fuel injection valve. This arrangement attains efficient and appropriate operation of the internal combustion engine with shared fuel injection from the in-cylinder fuel injection valve and from the port fuel injection valve at the specified allocation rate.

In one preferable embodiment of the control method of the power output apparatus of the invention, the step (b) sets the target operating state of the internal combustion engine by distributing a first operating state and a second operating state of the internal combustion engine by a ratio of the specified allocation rate to the predetermined first allocation rate and a ratio of the specified allocation rate to the predetermined second allocation rate, where the first operating state of the internal combustion engine is set based on the first constraint and the target power and the second operating state of the internal combustion engine is set based on the second constraint and the target power. In this embodiment, the first operating state and the second operating state are distributed according to the ratio of the specified allocation rate to the predetermined first allocation rate and the ratio of the specified allocation rate to the predetermined second allocation rate. This arrangement sets an optimum operating state between the first operating state and the second operating state to the target operating state and drives the internal combustion engine in the target operating state. This attains efficient and appropriate operation of the internal combustion engine.

In another preferable embodiment of the control method of the power output apparatus of the invention, each of the first constraint and the second constraint includes multiple restrictions with regard to multiple conditions. The step (b) sets the target operating state of the internal combustion engine, based on a certain restriction included in the first constraint and a corresponding restriction included in the second constraint with regard to a selected condition among the multiple conditions. When the internal combustion engine is driven with the multiple restrictions, the arrangement of this embodiment ensures appropriate operation of the internal combustion engine with the restrictions under the selected condition.

In still another preferable embodiment of the control method of the power output apparatus of the invention, the first constraint regards operation of the internal combustion engine with fuel injection from only the in-cylinder fuel injection valve, and the second constraint regards operation of the internal combustion engine with fuel injection from only the port fuel injection valve. The operation of the internal combustion engine is thus controllable with the restriction imposed on the operation of the internal combustion engine with fuel injection from only the in-cylinder fuel injection valve and with the restriction imposed on the operation of the internal combustion engine with fuel injection from only the port fuel injection valve.

BRIEF DESCRIPTION OF THE DRAWINGS

FIG. 11 is a flowchart showing a drive control routine executed by an electronic control unit included in the motor vehicle of the second embodiment.

DESCRIPTION OF THE PREFERRED EMBODIMENTS

Figure 1:
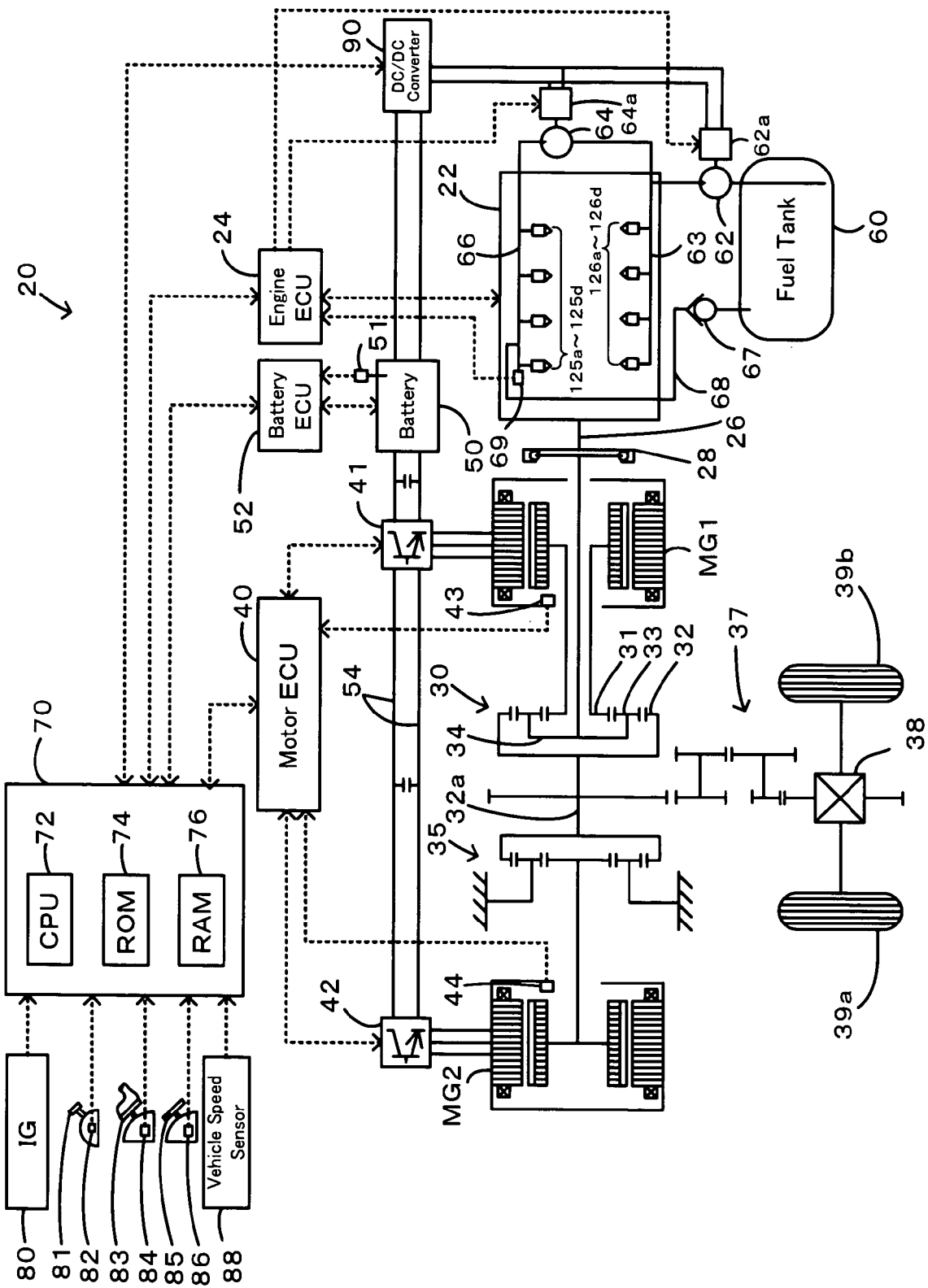
FIG. 1 schematically illustrates the configuration of a hybrid vehicle equipped with a power output apparatus in one embodiment of the invention.

One mode of carrying out the invention is described below as a preferred embodiment. FIG. 1 schematically illustrates the configuration of a hybrid vehicle 20 equipped with a power output apparatus in one embodiment of the invention. As illustrated, the hybrid vehicle 20 of the embodiment includes an engine 22 and a three shaft-type power distribution integration mechanism 30 having a sun gear 31, a ring gear 32, and a carrier 34 connecting with multiple pinion gears 33. The carrier 34 of the power distribution integration mechanism 30 is linked to a crankshaft 26 or an output shaft of the engine 22 via a damper 28. A ring gear shaft 32a connecting with the ring gear 32 is linked to drive wheels 39a and 39b via a gear mechanism 37 and a differential gear 38. The hybrid vehicle 20 of the embodiment further includes a motor MG1 that is linked to the sun gear 31 of the power distribution integration mechanism 30 and has power generation capability, a motor MG2 that is linked to the ring gear 32 of the power distribution integration mechanism 30 via the ring gear shaft 32a and a reduction gear 35, and a hybrid electronic control unit 70 that controls the operations of the whole power output apparatus.

Figure 2:
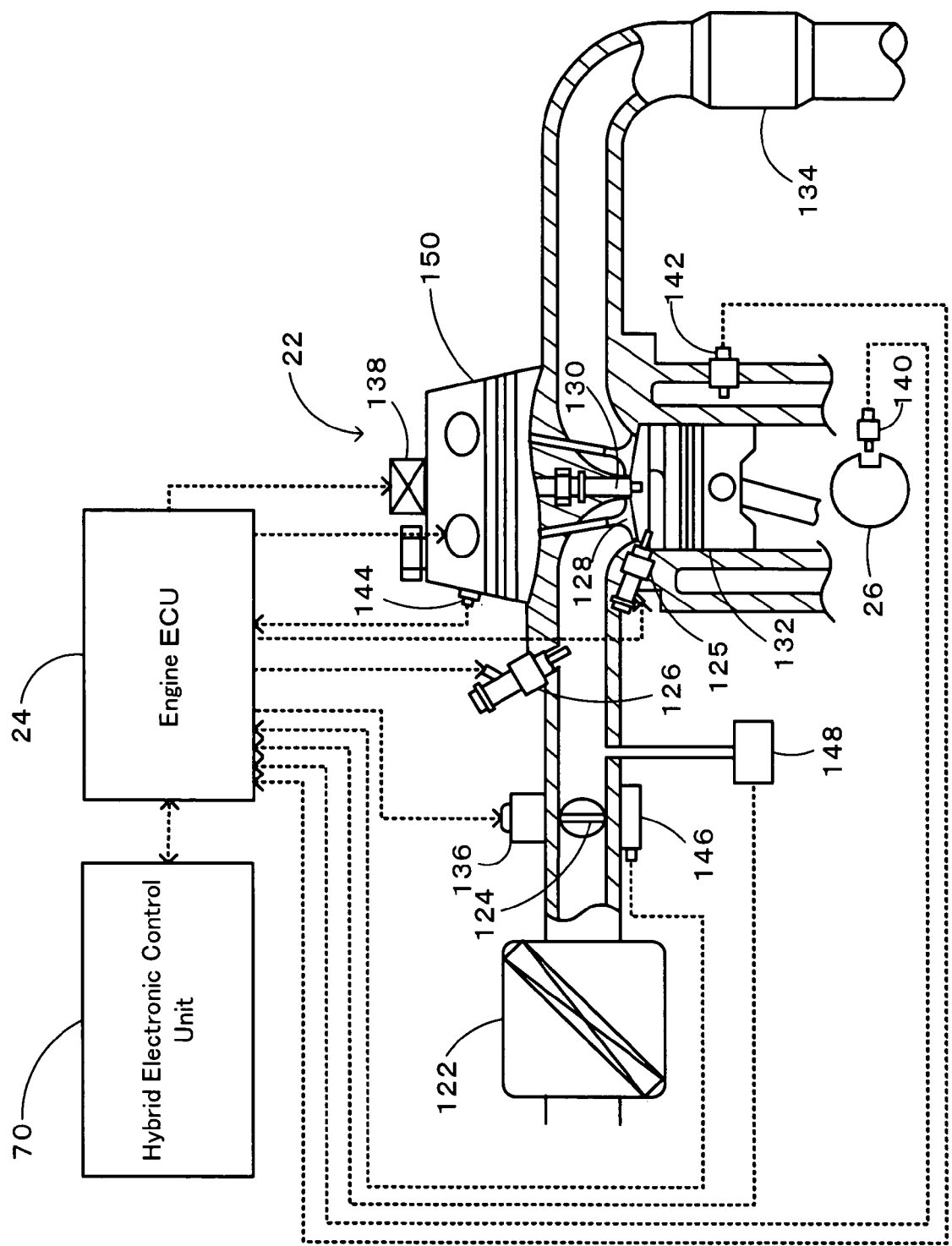
FIG. 2 schematically shows the structure of an engine mounted on the hybrid vehicle of the embodiment.

As illustrated in FIG. 2, the engine 22 is constructed as an internal combustion engine having multiple in-cylinder fuel injection valves 125 (125a through 125d in FIG. 1) for directly injecting a hydrocarbon fuel, such as gasoline or light oil, into cylinders and multiple port fuel injection valves 126 (126a through 126d in FIG. 1) for injecting the fuel in an intake port. The engine 22 having the two sets of the fuel injection valves 125 and 126 are operated and controlled in one of a port injection drive mode, an in-cylinder injection drive mode, and in a shared injection drive mode. In the port injection drive mode, the air cleaned by an air cleaner 122 and taken in via a throttle valve 124 is mixed with the atomized fuel injected from the port fuel injection valves 126 to the air-fuel mixture. The air-fuel mixture is introduced into a combustion chamber of each cylinder by an intake valve 128 and is ignited with a spark of an ignition plug 130 to be explosively combusted. The reciprocating motions of a piston 132 in each cylinder by the combustion energy are converted into rotational motions of the crankshaft 26. In the in-cylinder injection drive mode, while the air cleaned by the air cleaner 122 and taken in via the throttle valve 124 is introduced into the combustion chamber of each cylinder by the intake valve 128, the fuel is injected from the in-cylinder fuel injection valves 125 in the course of an intake stroke or in a compression stroke in the cylinder. The resulting air-fuel mixture is ignited with the spark of the ignition plug 130 to be explosively combusted and give the rotational motions of the crankshaft 26. In the shared injection drive mode, the air is mixed with the fuel injected from the port fuel injection valves 126 and is introduced as the air-fuel mixture into the combustion chamber, while the air in the combustion chamber is mixed with the fuel injected from the in-cylinder fuel injection valves 125 in the intake stroke or in the compression stroke. Combustion of the resulting air-fuel mixture gives the rotational motions of the crankshaft 26. The operation mode of the engine 22 is selectively changed over among these three drive modes according to the actual operating conditions and required operating conditions of the engine 22. The exhaust from the engine 22 goes through a catalytic converter (three-way catalyst) 134 that converts toxic components included in the exhaust, that is, carbon monoxide (CO), hydrocarbons (HC), and nitrogen oxides (NOx), into harmless components, and is discharged to the outside air.

As shown in FIG. 1, the port fuel injection valves 126a through 126d receive a supply of fuel fed from a fuel tank 60 by means of a fuel pump 62. The in-cylinder fuel injection valves 125a through 125d receive a high-pressure supply of fuel fed from the fuel tank 60 by means of the fuel pump 62, pressurized by a high-pressure fuel pump 64, and delivered through a delivery pipe 66. Motors 62a and 64a working as actuators of the fuel pump 62 and the high-pressure fuel pump 64 receive a supply of electric power from a battery 50 via a DC-DC converter 90. A check valve (not shown) is provided on a discharge side of the high-pressure fuel pump 64 to prevent a reverse flow of the fuel and to keep a fuel pressure in the delivery pipe 66 at a constant level. The delivery pipe 66 is connected with a relief pipe 68 that circulates the flow of fuel into the fuel tank 60 via a relief valve 67 for preventing an excessive level of the fuel pressure. The fuel pressure of the fuel supplied to the in-cylinder fuel injection valves 125a through 125d in a stop state of the engine 22 is decreased to a preset level to prevent leakage of the fuel from the in-cylinder fuel injection valves 125a through 125d.

The engine 22 is under control of an engine electronic control unit 24 (hereafter referred to as engine ECU 24). The engine ECU 24 receives, via its input port (not shown), diverse signals from various sensors that measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chambers, a throttle valve position from a throttle valve position sensor 146 detected as the opening or position of the throttle valve 124, an intake air flow from a vacuum sensor 148 measured as the load of the engine 22, and a fuel pressure Pf from a fuel pressure sensor 69 attached to the delivery pipe 66 for supplying the fuel to the in-cylinder fuel injection valves 125a through 125d. The engine ECU 24 outputs, via its output port (not shown), diverse control signals and driving signals to drive and control the engine 22. The signals output from the engine ECU 24 include driving signals to the in-cylinder fuel injection valves 125a through 125d and the port fuel injection valves 126a through 126d, driving signals to a throttle valve motor 136 for regulating the position of the throttle valve 124, control signals to an ignition coil 138 integrated with an igniter, control signals to a variable valve timing mechanism 150 to vary the open and close timings of the intake valve 128, and driving signals to the motors 62a and 64a of the fuel pump 62 and the high-pressure fuel pump 64. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The motors MG1 and MG2 are constructed as known synchronous motor generators that may be actuated both as a generator and as a motor. The motors MG1 and MG2 are connected with the battery 50 by power lines 54 and transmit electric powers to and from the battery 50 via inverters 41 and 42. Both the motors MG1 and MG2 are driven and controlled by a motor electronic control unit 40 (hereafter referred to as motor ECU 40). The motor ECU 40 inputs signals required for controlling the operations of the motors MG1 and MG2, for example, signals representing rotational positions of rotors in the motors MG1 and MG2 from rotational position detection sensors 43 and 44 and signals representing phase currents to be applied to the motors MG1 and MG2 from electric current sensors (not shown). The motor ECU 40 outputs switching control signals to the inverters 41 and 42. The motor ECU40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from ai gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand Tr* to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand Tr* to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a. The torque conversion drive mode is equivalent to the charge-discharge drive mode with the charge-discharge electric power of the battery 50 equal to zero. There is accordingly no necessity to specifically discriminate the torque conversion drive mode from the charge-discharge drive mode. The hybrid vehicle 20 of the embodiment thus runs with changeover of the drive mode between the motor drive mode and the charge-discharge drive mode.

Figure 3:
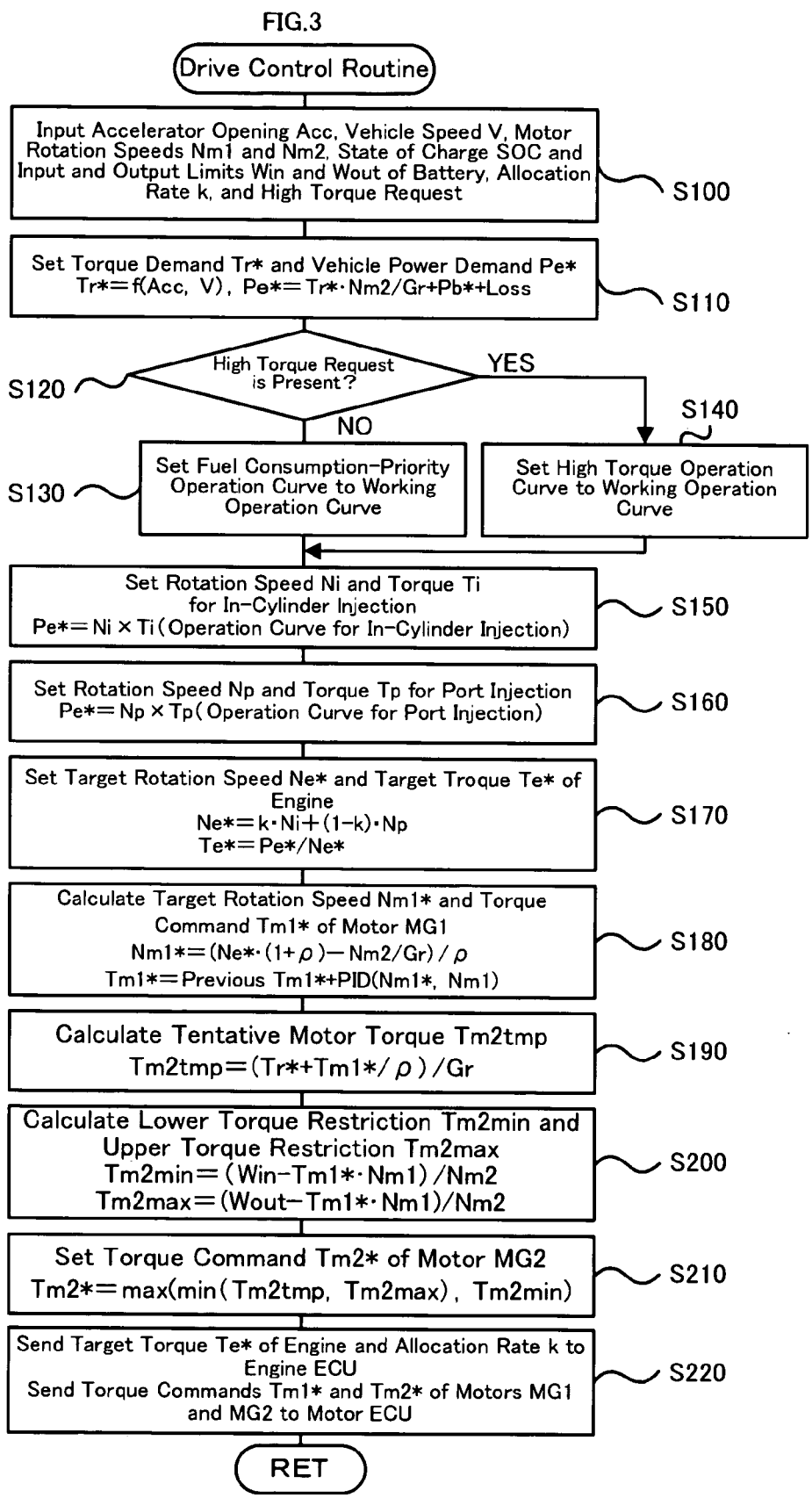
FIG. 3 is a drive control routine executed by a hybrid electronic control unit included in the hybrid vehicle of the embodiment.

The description regards the operations of the hybrid vehicle 20 of the embodiment having the configuration discussed above. FIG. 3 is a flowchart showing a drive control routine executed by the hybrid electronic control unit 70 in the hybrid vehicle 20 of the embodiment. This drive control routine is performed repeatedly at preset time intervals, for example, at every several msec.

In the drive control routine of FIG. 3, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, the state of charge SOC of the battery 50, an input limit Win and an output limit Wout of the battery 50, an allocation rate k of fuel injection from the in-cylinder fuel injection valves 125 to fuel injection from the port fuel injection valves 126, and a high torque request with preference to a high torque over fuel consumption (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The state of charge SOC of the battery 50 is computed from the accumulated charge-discharge current of the battery 50 measured by the electric current sensor (not shown) and is received from the battery ECU 52 by communication. The input limit Win and the output limit Wout of the battery 50 are set based on the battery temperature and the state of charge SOC of the battery 50 and are received from the battery ECU 52 by communication. The allocation rate k is set according to an allocation rate setting routine (not shown) executed by the hybrid electronic control unit 70. The high torque request is entered corresponding to the value of a flag that selectively specifies either a fuel consumption priority or a torque priority based on the driver's depression amount and the depression speed of the accelerator pedal 83.

Figure 4:
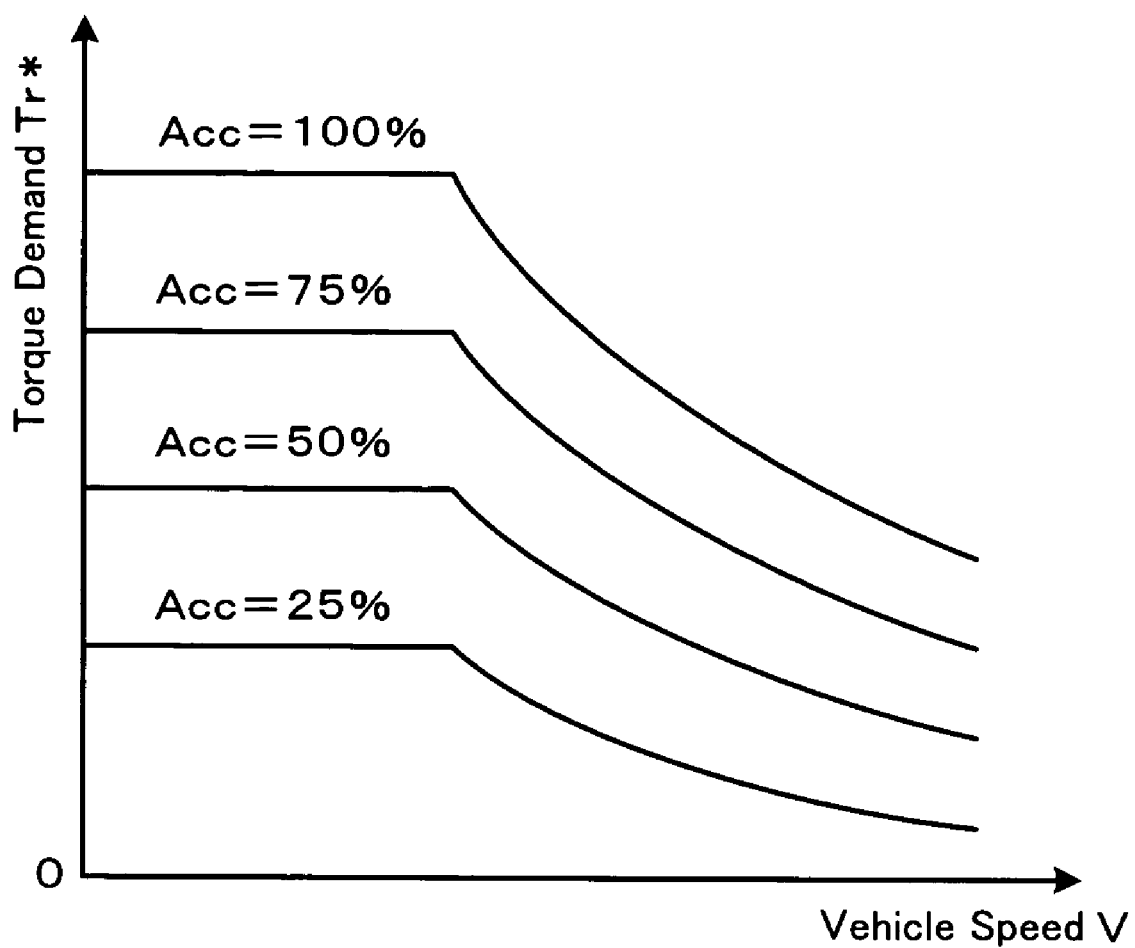
FIG. 4 shows one example of a torque demand setting map.

After the data input, the CPU 72 sets a torque demand Tr* to be output to the ring gear shaft 32*a* or a driveshaft linked with the drive wheels 39*a* and 39*b* and a vehicle power demand Pe* required for the whole hybrid vehicle 20, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 4. The vehicle power demand Pe* is calculated as the sum of the product of the torque demand Tr* and a rotation speed Nr of the ring gear shaft 32*a*, a charge-discharge power demand Pb* to be charged into or discharged from the battery 50, and a potential loss. The rotation speed Nr of the ring gear shaft 32*a* is obtained by dividing the rotation speed Nm2 of the motor MG2 by a gear ratio Gr of the reduction gear 35 or by multiplying the vehicle speed V by a preset conversion factor. The charge-discharge electric power Pb* is set based on the state of charge SOC of the battery 50 and the accelerator opening Acc.

Figure 5:
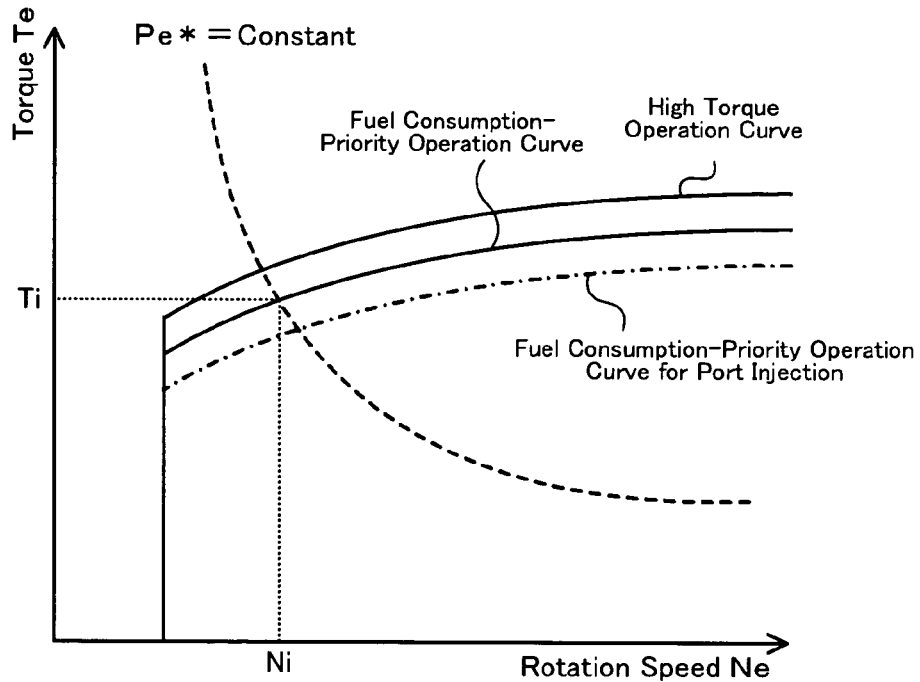
FIG. 5 shows a fuel consumption-priority operation curve and a high torque operation curve for in-cylinder injection to set a rotation speed Ni and a torque Ti for in-cylinder injection.
Figure 6:
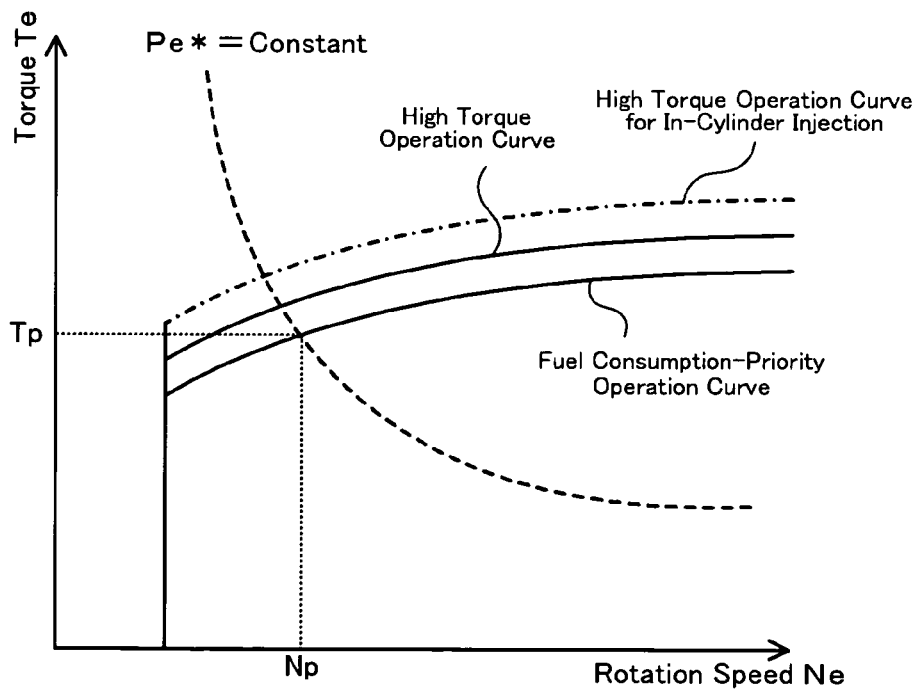
FIG. 6 shows a fuel consumption-priority operation curve and a high torque operation curve for port injection to set a rotation speed Np and a torque Tp for port injection.

The CPU 72 subsequently specifies the presence or the absence of the high torque request (step S120). In the absence of the high torque request (step S120: No), fuel consumption-priority operation curves as constraints for efficient operation of the engine 22 are set to working operation curves used as constraints to set the drive point of the engine 22 (step S130). In the presence of the high torque request (step S120: Yes), on the other hand, high torque operation curves as constraints for output of a higher torque from the engine 22 at a fixed rotation speed are set to the working operation curves (step S140). FIG. 5 shows one example of the fuel consumption-priority operation curve and the high torque operation curve used in the operation of the engine 22 with fuel injection from only the in-cylinder fuel injection valves 125. FIG. 6 shows one example of the fuel consumption-priority operation curve and the high torque operation curve used in the operation of the engine 22 with fuel injection from only the port fuel injection valves 126. The one-dot chain line curve in FIG. 5 shows the fuel consumption-priority operation curve used in the operation of the engine 22 with fuel injection from only the port fuel injection valves 126. The one-dot chain line curve in FIG. 6 shows the high torque operation curve used in the operation of the engine 22 with fuel injection from only the in-cylinder fuel injection valves 125. As clearly understood from FIGS. 5 and 6, the high torque operation curve is located at the higher torque than the fuel consumption-priority operation curve. The in-cylinder injection gives the higher filling rate of the intake air into the combustion chamber than the port injection. Both the fuel consumption-priority operation curve and the high torque operation curve used in the operation of the engine 22 with fuel injection from only the in-cylinder fuel injection valves 125 are accordingly located at the higher torque than the fuel consumption-priority operation curve and the high torque operation curve used in the operation of the engine 22 with fuel injection from only the port fuel injection valves 126. Setting the fuel consumption-priority operation curves to the working operation curves at step S130 respectively sets the fuel consumption-priority operation curve for in-cylinder injection in the operation of the engine 22 with fuel injection from only the in-cylinder fuel injection valves 125 and the fuel consumption-priority operation curve for port injection in the operation of the engine 22 with fuel injection from only the port fuel injection valves 126 to the working operation curves. Setting the high torque operation curves to the working operation curves at step S140 respectively sets the high torque operation curve for in-cylinder injection in the operation of the engine 22 with fuel injection from only the in-cylinder fuel injection valves 125 and the high torque operation curve for port injection in the operation of the engine 22 with fuel injection from only the port fuel injection valves 126 to the working operation curves.

The CPU 72 sequentially sets a rotation speed Ni and a torque Ti for in-cylinder injection as a drive point for outputting the vehicle power demand Pe* according to the working operation curves set for in-cylinder injection (step S150) and sets a rotation speed Np and a torque Tp for port injection as a drive point for outputting the vehicle power demand Pe* according to the working operation curves set for port injection (step S160). FIGS. 5 and 6 respectively show a process of setting the rotation speed Ni and the torque Ti for in-cylinder injection and a process of setting the rotation speed Np and the torque Tp for port injection, when the fuel consumption-priority operation curves are set to the working operation curves for in-cylinder injection and for port injection. As shown in FIG. 5, the rotation speed Ni and the torque Ti for in-cylinder injection are given as an intersection of the fuel consumption-priority operation curve and a curve of constant vehicle power demand Pe* (=Ni×Ti). As shown in FIG. 6, the rotation speed Np and the torque Tp for port injection are given as an intersection of the fuel consumption-priority operation curve and the curve of constant vehicle power demand Pe* (=Np×Tp).

The CPU 72 sets a target rotation speed Ne* of the engine 22 as distribution of the rotation speed Ni for in-cylinder injection and the rotation speed Np for port injection by the allocation rate k according to Equation (1) given below, and divides the vehicle power demand Pe* by the target rotation speed Ne* to set a target torque Te* of the engine 22 (step S170)

$$Ne^* = k \cdot Ni + (1-k) \cdot Np \tag{1}$$

After setting the target rotation speed Ne* and the target torque Te* of the engine 22, the CPU 72 calculates a target rotation speed Nm1* of the motor MG1 from the target rotation speed Ne* of the engine 22, the rotation speed Nr (=Nm2/Gr) of the ring gear shaft 32*a*, and a gear ratio ρ of the power distribution integration mechanism 30 according to Equation (2) given below, while calculating a torque command Tm1* of the motor MG1 from the calculated target rotation speed Nm1* and the current rotation speed Nm1 of the motor MG1 according to Equation (3) given below (step S180):

$$Nm1^* = (Ne^* \cdot (1+\rho) - Nm2/Gr)/\rho \tag{2}$$

$$Tm1^* = \text{Previous } Tm1^* + KP(Nm1^* - Nm1) + KI \int (Nm1^* - Nm1) dt \tag{3}$$

Figure 7:
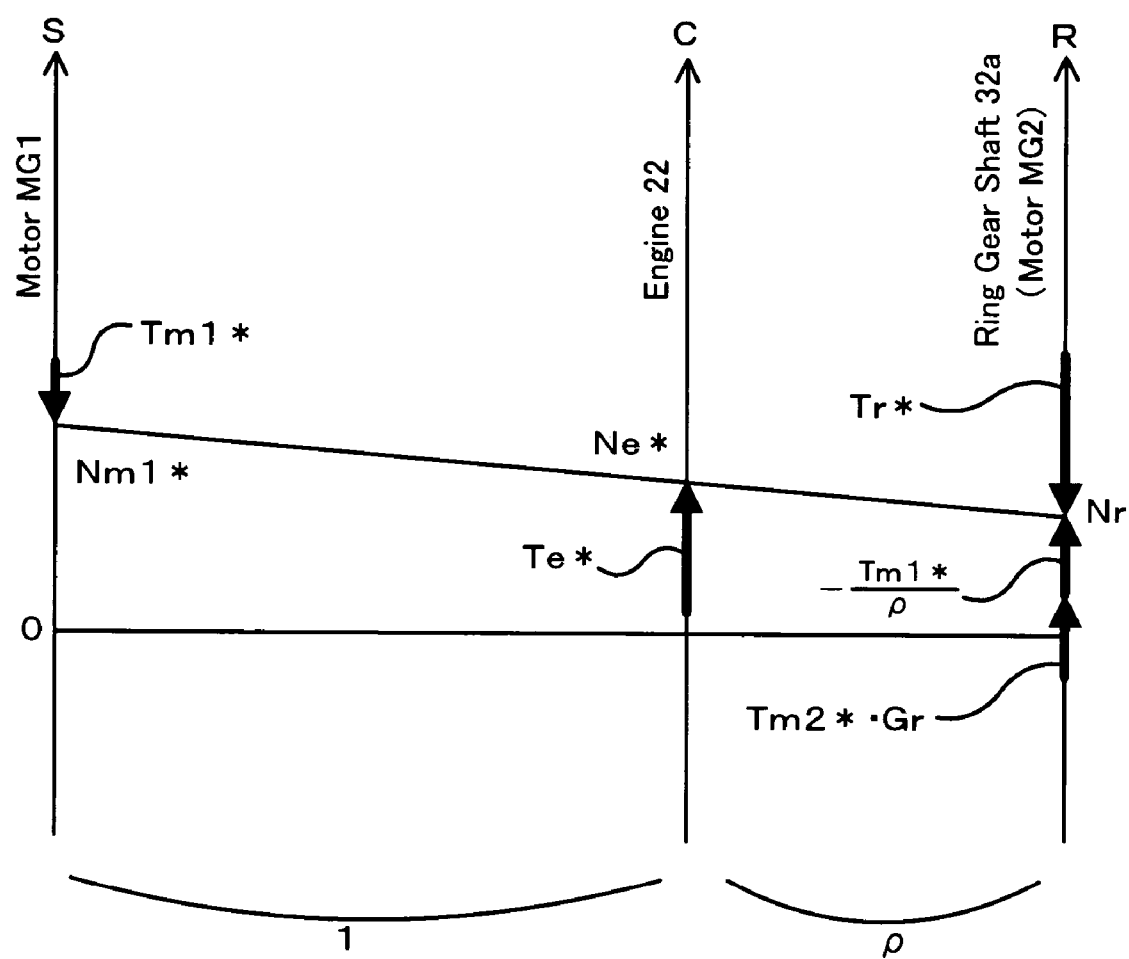
FIG. 7 is an alignment chart showing torque-rotation speed dynamics of respective rotational elements of a power distribution integration mechanism included in the hybrid vehicle of the embodiment.

FIG. 7 is an alignment chart showing torque-rotation speed dynamics of the respective rotational elements included in the power distribution integration mechanism 30. The left axis 'S', the middle axis 'C', and the right axis 'R' respectively show the rotation speed of the sun gear 31, the rotation speed of the carrier 34, and the rotation speed Nr of the ring gear 32 (ring gear shaft 32*a*). As mentioned previously, the rotation speed of the sun gear 31 is equivalent to the rotation speed Nm1 of the motor MG1, and the rotation speed of the carrier 34 is equivalent to the rotation speed Ne of the engine 22. The target rotation speed Nm1* of the motor MG1 is thus computable from the rotation speed Nr of the ring gear shaft 32a, the target rotation speed Ne* of the engine 22, and the gear ratio ρ of the power distribution integration mechanism 30 according to Equation (2) given above. The torque command Tm1* is then set to drive and rotate the motor MG1 at the target rotation speed Nm1*. Drive control of the motor MG1 with the settings of the torque command Tm1* and the target rotation speed Nm1* enables rotation of the engine 22 at the target rotation speed Ne*. Equation (3) is a relational expression of feedback control to drive and rotate the motor MG1 at the target rotation speed Nm1*. In Equation (3) given above, 'KP' in the second term and 'KI' in the third term on the right side respectively denote a gain of the proportional and a gain of the integral term. Two upward thick arrows on the axis 'R' in FIG. 7 respectively show a torque that is transmitted to the ring gear shaft 32a when the torque Te* is output from the engine 22 that is in steady operation at a specific drive point of the target rotation speed Ne* and the target torque Te*, and a torque that is applied to the ring gear shaft 32a via the reduction gear 35 when a torque Tm2* is output from the motor MG2.

After calculation of the target rotation speed Nm1* and the torque command Tm1* of the motor MG1, the CPU 72 calculates a tentative motor torque Tm2tmp, which is to be output from the motor MG2 for application of the torque demand Tr* to the ring gear shaft 32a, from the torque demand Tr*, the torque command Tm1* of the motor MG1, the gear ratio ρ of the power distribution integration mechanism 30, and the gear ratio Gr of the reduction gear 35 according to Equation (4) given below (step S190):

$$Tm2tmp=(Tr^*+Tm1^*/\rho)/Gr \quad (4)$$

Equation (4) is readily introduced from the torque balance in the alignment chart of FIG. 7. The CPU 72 then calculates a lower torque restriction Tm2min and an upper torque restriction Tm2max as minimum and maximum torques output from the motor MG2, from the input limit Win and the output limit Wout of the battery 50, the torque command Tm1* and the current rotation speed Nm1 of the motor MG1 and the current rotation speed Nm2 of the motor MG2 according to Equations (5) and (6) given below (step S200):

$$Tm2\min=(Win-Tm1^*\cdot Nm1)/Nm2 \quad (5)$$

$$Tm2\max=(Wout-Tm1^*-Nm1)/Nm2 \quad (6)$$

The CPU 72 compares the calculated lower torque restriction Tm2min with the smaller between the calculated tentative motor torque Tm2tmp and the calculated upper torque restriction Tm2max and sets the greater to a torque command Tm2* of the motor MG2 (step S210). Such setting restricts the torque command Tm2* of the motor MG2 within the range between the input limit Win and the output limit Wout of the battery 50.

After setting the target rotation speed Ne* and the target torque Te* of the engine 22 and the torque commands Tm1* and Tm2* of the motors MG1 and MG2, the CPU 72 sends the target torque Te* of the engine 22 and the allocation rate k to the engine ECU 24, while sending the torque commands Tm1* and Tm2* of the motors MG1 and MG2 to the motor ECU 40 (step S220). The CPU 72 then exits from this drive control routine of FIG. 3. The engine ECU 24 receives the target torque Te* and the allocation rate k and performs required controls and regulations including fuel injection control, ignition control, and throttle opening regulation. The engine ECU 24 controls fuel injection from the in-cylinder fuel injection valves 125 and from the port fuel injection valves 126 according to the allocation rate k and thus enables the engine 22 rotating at the target rotation speed Ne* to output the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

As described above, in the hybrid vehicle 20 of the embodiment, the drive control sets the target rotation speed Ne* and the target torque Te* of the engine 22 by distributing the rotation speed Ni for in-cylinder injection and the rotation speed Np for port injection by the allocation rate k of fuel injection from the in-cylinder fuel injection valves 125 to fuel injection from the port fuel injection valves 126. Here the rotation speed Ni for in-cylinder injection is set according to the operation curve for in-cylinder injection in the operation of the engine 22 with fuel injection from only the in-cylinder fuel injection valves 125. The rotation speed Np for port injection is set according to the operation curve for port injection in the operation of the engine 22 with fuel injection from only the port fuel injection valves 126. The drive control of the hybrid vehicle 20 then sets the torque commands Tm1* and Tm2* of the motors MG1 and MG2 and controls the engine 22 and the motors MG1 and MG2 to drive the engine 22 at a specific drive point defined by the target rotation speed Ne* and the target torque Te* and to ensure output of the torque demand Tr* to the ring gear shaft 32a or the driveshaft. This arrangement enables the engine 22 to be driven in the appropriate operating conditions and ensures output of the torque demand Tr* to the ring gear shaft 32a even in the state of shared fuel injection from the in-cylinder fuel injection valves 125 and from the port fuel injection valves 126. When the fuel consumption-priority operation curves are set to the working operation curves, this arrangement enables efficient operation of the engine 22 and ensures output of the torque demand Tr* to the ring gear shaft 32a even in the state of shared fuel injection from the in-cylinder fuel injection valves 125 and from the port fuel injection valves 126.

In the absence of the high torque request, the hybrid vehicle 20 of the embodiment sets the fuel consumption-priority operation curves to both the working operation curve for in-cylinder injection and the working operation curve for port injection, sets the target rotation speed Ne* and the target torque Te* of the engine 22 according to the fuel consumption-priority operation curves, and controls the engine 22 and the motors MG1 and MG2. In the presence of the high torque request, on the other hand, the hybrid vehicle 20 of the embodiment sets the high torque operation curves to both the working operation curve for in-cylinder injection and the working operation curve for port injection, sets the target rotation speed Ne* and the target torque Te* of the engine 22 according to the high torque operation curves, and controls the engine 22 and the motors MG1 and MG2. This arrangement enables the engine 22 to be driven in the appropriate operating conditions and ensures output of the torque demand Tr* to the ring gear shaft 32a even in the state of shared fuel injection from the in-cylinder fuel injection valves 125 and from the port fuel injection valves 126 with a change of the constraint to set the drive point of the engine 22 in response to the high torque request.

In the hybrid vehicle 20 of the embodiment, the operation of the motor MG2 is controlled with the torque command Tm2*, which is set within the range of the input limit Win to the output limit Wout of the battery 50. This arrangement protects the battery 50 from being overcharged with excessive electric power or from being over-discharged to output excessive electric power, thus preventing untimely deterioration of the battery 50.

Figure 8:
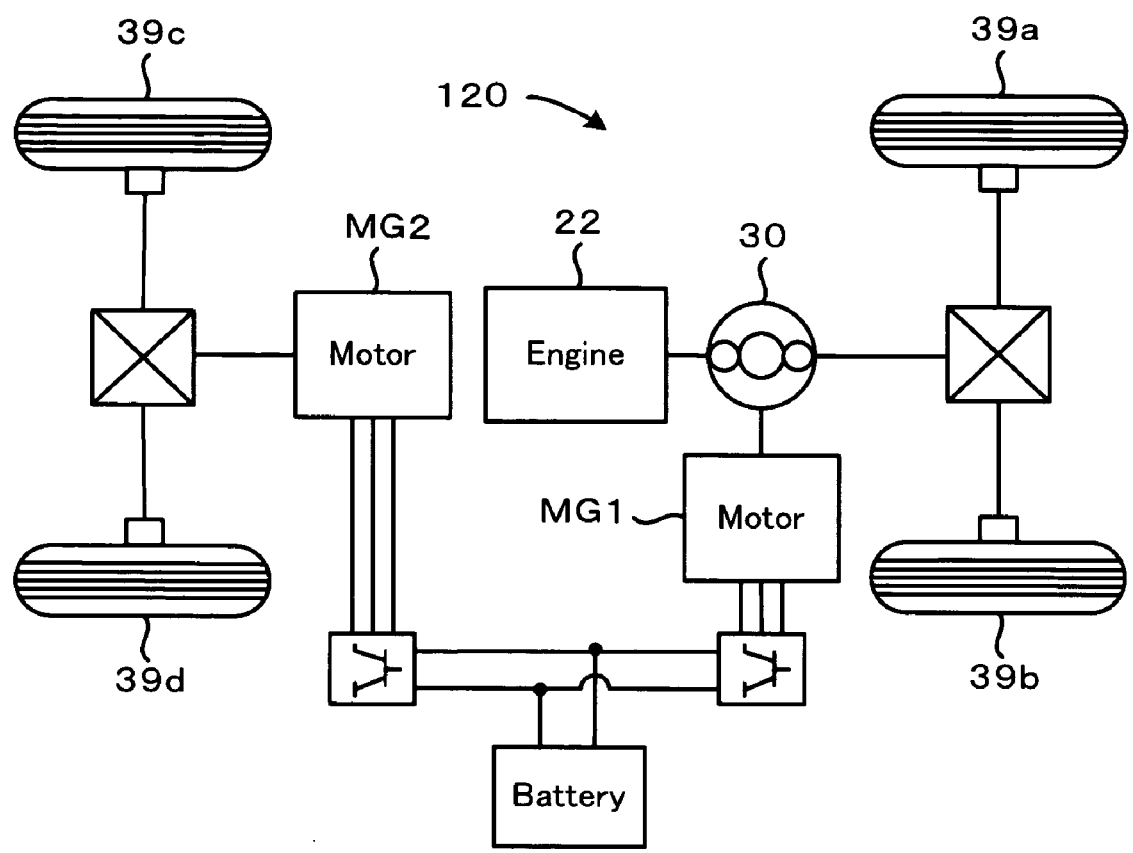
FIG. 8 schematically illustrates the configuration of another hybrid vehicle in one modified example.
Figure 9:
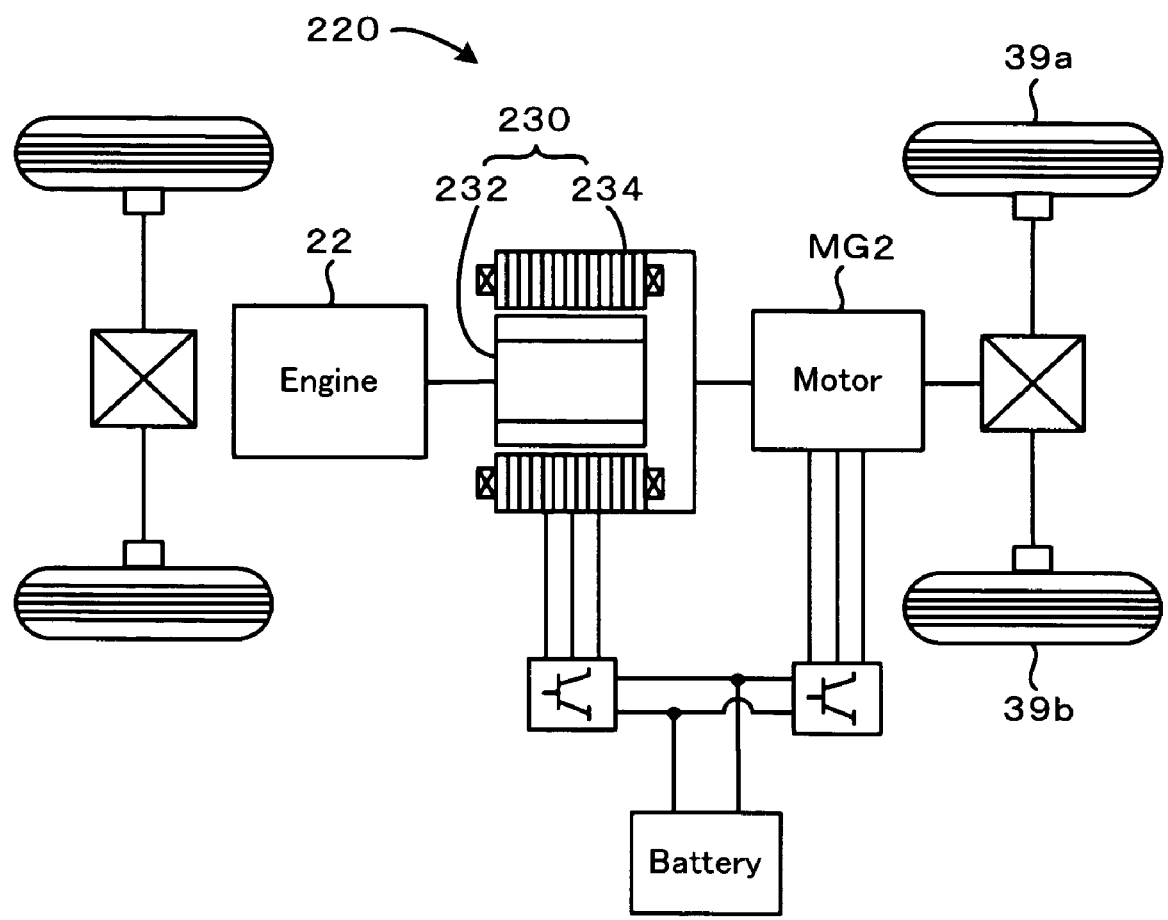
FIG. 9 schematically illustrates the configuration of still another hybrid vehicle in another modified example.

In the hybrid vehicle 20 of the embodiment, the power of the engine 22 is output via the power distribution integration mechanism 30 to the ring gear shaft 32a or the driveshaft connected to the drive wheels 39a and 39b. The technique of the invention is, however, not restricted to this configuration but may also be applicable to another hybrid vehicle 120 of one modified configuration shown in FIG. 8 or to still another hybrid vehicle 220 of another modified configuration shown in FIG. 9. In the hybrid vehicle 120 of FIG. 8, the power of the motor MG2 is transmitted to a different axle (an axle linked to wheels 39c and 39d) from the axle connecting with the ring gear shaft 32a (the axle linked to the drive wheels 39a and 39b). The hybrid vehicle 220 of FIG. 9 has a pair-rotor motor 230 including an inner rotor 232 connected to the crankshaft 26 of the engine 22 and an outer rotor 234 connected to a driveshaft for output of the power to the drive wheels 39a and 39b. The pair-rotor motor 230 transmits part of the output power of the engine 22 to the driveshaft, while converting the residual engine output power into electric power.

Figure 10:
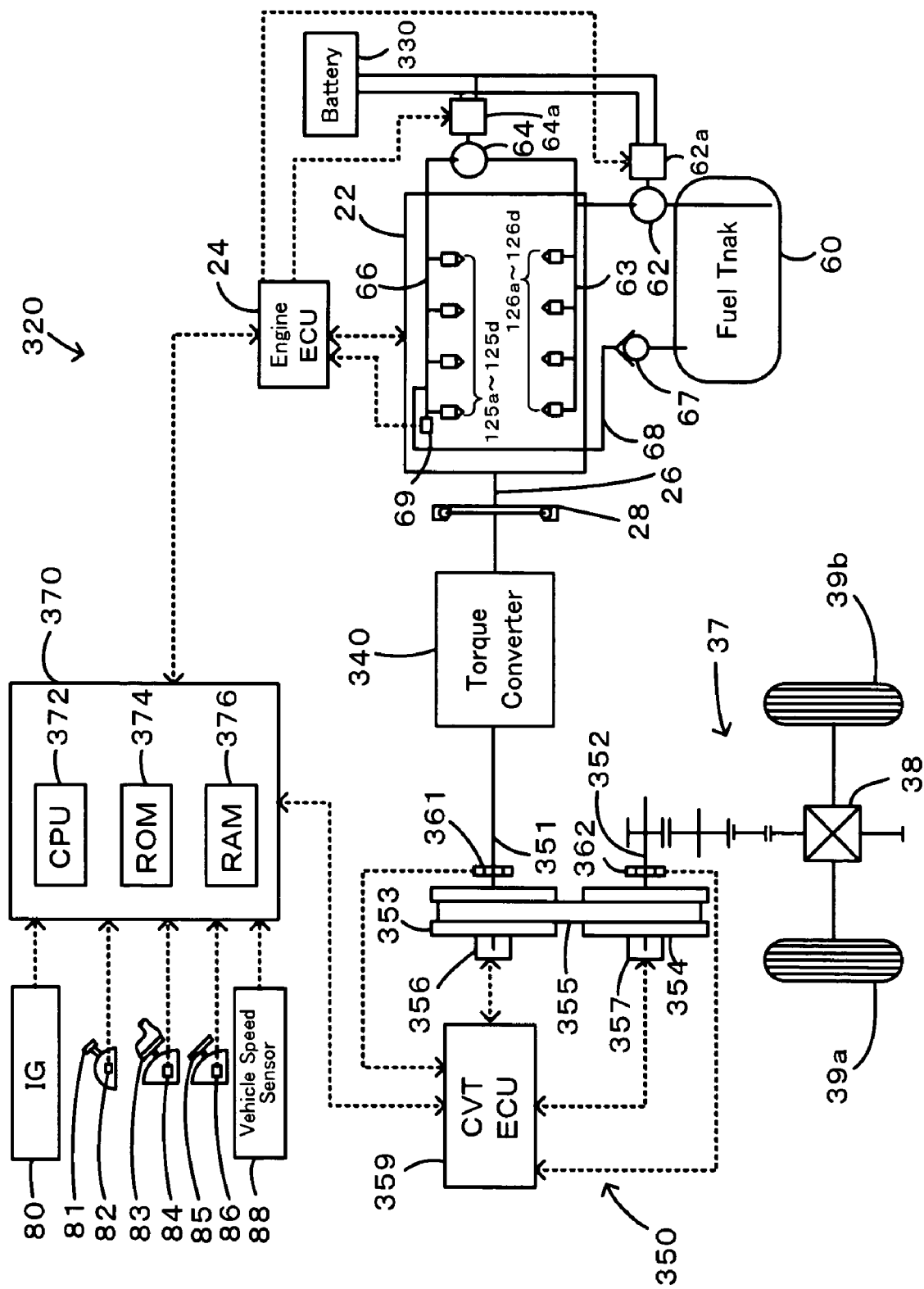
FIG. 10 schematically illustrates the configuration of a motor vehicle equipped with a power output apparatus in a second embodiment of the invention.

The technique of the invention is also actualized by a motor vehicle 320 described below as a second embodiment of the invention. FIG. 10 schematically illustrates the configuration of the motor vehicle 320 equipped with a power output apparatus in the second embodiment of the invention. As clearly understood from comparison between FIG. 1 and FIG. 10, the motor vehicle 320 of the second embodiment has a torque converter 340 and a belt continuous variable transmission (CVT) 350, in place of the power distribution integration mechanism 30 and the motors MG1 and MG2 included in the hybrid vehicle 20 of the first embodiment. The like constituents in the motor vehicle 320 of the second embodiment to those in the hybrid vehicle 20 of the first embodiment are expressed by the like numerals and symbols and are not specifically described here. In the motor vehicle 320 of the second embodiment, a battery 330 receives a supply of electric power generated by an alternator (not shown) actuated via a belt (not shown) set on the crankshaft 26 of the engine 22 and supplies electric power to the motors 62a and 64a working as the actuators for the fuel pump 62 and the high-pressure fuel pump 64.

As shown in FIG. 10, the motor vehicle 320 of the second embodiment includes the engine 22 with the in-cylinder fuel injection valves 125 and the port fuel injection valves 126, which is identical with the engine 22 included in the hybrid vehicle 20 of the first embodiment. The motor vehicle 320 of the second embodiment also includes the conventional fluid torque converter 340 connecting with the crankshaft 26 of the engine 22 via the damper 28, the belt continuous variable transmission (CVT) 350 having an input shaft 351 linked to the torque converter 340 and an output shaft 352 linked to the gear mechanism 37, which connects with the drive wheels 39a and 39b via the differential gear 38, and an electronic control unit 370 controlling the operations of the whole motor vehicle 320.

The CVT 350 includes a primary pulley 353 that has a variable groove width and is linked to the input shaft 351, a secondary pulley 354 that has a variable groove width and is linked to the output shaft 352 or a driveshaft, a belt 355 that is set in the grooves of the primary pulley 353 and the secondary pulley 354, and first and second actuators 356 and 357 that respectively vary the groove widths of the primary pulley 353 and the secondary pulley 354. Varying the groove widths of the primary pulley 353 and the secondary pulley 354 by the first actuator 356 and the second actuator 357 attains the continuously variable speed to convert the power of the input shaft 351 and output the converted power to the output shaft 352. The first actuator 356 is constructed as a hydraulic actuator and is used to regulate the change gear ratio. The second actuator 357 is also constructed as a hydraulic actuator and is used to adjust the clamping pressure of the belt 355 for regulation of a torque transmission capacity of the CVT 350. The hydraulic pressures required for actuation of the first actuator 356 and the second actuator 357 are generated by a mechanical pump (not shown) attached to the crankshaft 26 of the engine 22. A CVT electronic control unit 359 (hereafter referred to as CVTECU 359) takes charge of the variable speed control and the belt clamping pressure adjustment of the CVT 350. The CVTECU 359 receives a rotation speed Nin of the input shaft 351 from a rotation speed sensor 361 attached to the input shaft 351 and a rotation speed Nout of the output shaft 352 from a rotation speed sensor 362 attached to the output shaft 352. The CVTECU 359 outputs driving signals to the first actuator 356 and to the second actuator 357. The CVTECU 359 communicates with the electronic control unit 370. The CVTECU 359 receives control signals from the electronic control unit 370 to regulate the change gear ratio (gear ratio γ) of the CVT 350 and to output data regarding the operating conditions of the CVT 350, for example, the rotation speed Nin of the input shaft 351 and the rotation speed Nout of the output shaft 352, to the electronic control unit 370 according to the requirements.

Like the hybrid electronic control unit 70 of the first embodiment, the electronic control unit 370 of the second embodiment is constructed as a microprocessor including a CPU 372, a ROM 374 that stores processing programs, a RAM 376 that temporarily stores data, input and output ports (not shown), and a communication port (not shown). The electronic control unit 370 receives, via its input port, the ignition signal from the ignition switch 80, the gearshift position SP or the current setting position of the gearshift lever 81 from the gearshift position sensor 82, the accelerator opening Acc or the driver's depression amount of the accelerator pedal 83 from the accelerator pedal position sensor 84, the brake pedal position BP or the driver's depression amount of the brake pedal 85 from the brake pedal position sensor 86, and the vehicle speed V from the vehicle speed sensor 88. The electronic control unit 370 is connected with the engine ECU 24 and the CVTECU 359 via its communication port to receive and send various data and control signals from and to the engine ECU 24 and the CVTECU 359.

The description regards the operations of the motor vehicle 320 of the second embodiment having the configuration discussed above. FIG. 11 is a flowchart showing a drive control routine executed by the electronic control unit 370 in the motor vehicle 320 of the second embodiment. This drive control routine is performed repeatedly at preset time intervals, for example, at every several msec.

In the drive control routine of FIG. 11, the CPU 372 of the electronic control unit 370 first inputs various data required for control, that is, the accelerator opening Acc from the accelerator pedal position sensor 84, the vehicle speed V from the vehicle speed sensor 88, the rotation speed Nin of the input shaft 351, the rotation speed Nout of the output shaft 352, the allocation rate k of fuel injection from the in-cylinder fuel injection valves 125 to fuel injection from the port fuel injection valves 126, and the high torque request with preference to a high torque over fuel consumption (step S300). The rotation speed Nin of the input shaft 351 and the rotation speed Nout of the output shaft 352 are measured respectively by the rotation speed sensors 361 and 362 and are received from the CVTECU 359 by communication. The allocation rate k and the high torque request have been defined in the first embodiment.

After the data input, the CPU 372 sets a torque demand Tout* to be output to the output shaft 352 or the driveshaft linked with the drive wheels 39a and 39b and a vehicle power demand Pe* required for the whole motor vehicle 320, based on the input accelerator opening Acc and the input vehicle speed V (step S310). A concrete procedure of setting the torque demand Tout* in this embodiment stores in advance variations in torque demand Tout* against the accelerator opening Acc and the vehicle speed V as a torque demand setting map in the ROM 374 and reads the torque demand Tout* corresponding to the given accelerator opening Acc and the given vehicle speed V from this torque demand setting map. The torque demand setting map used in the second embodiment is similar to the map shown in FIG. 4. The vehicle power demand Pe* is obtained as the product of the torque demand Tout* and the rotation speed Nout of the output shaft 352.

The CPU 372 subsequently executes the processing of steps S320 through S370 to set the target rotation speed Ne* and the target torque Te* of the engine 22. The processing of steps S320 through S370 is identical with the processing of steps S120 to S170 in the drive control routine of FIG. 3 and is thus not specifically described here. The CPU 72 then sets the target rotation speed Ne* of the engine 22 to a target rotation speed Nin* of the input shaft 351 (step S380) and sends the target torque Te* of the engine 22 and the allocation rate k to the engine ECU 24 and the target rotation speed Ni* of the input shaft 351 to the CVTECU 359 (step S390). The CPU 72 then exits from this drive control routine of FIG. 11. As described in the first embodiment, the engine ECU 24 receives the target torque Te* and the allocation rate k and performs required controls and regulations including fuel injection control, ignition control, and throttle opening regulation. The engine ECU 24 controls fuel injection from the in-cylinder fuel injection valves 125 and from the port fuel injection valves 126 according to the allocation rate k and thus enables the engine 22 rotating at the target rotation speed Ne* to output the target torque Te*. The CVTECU 359 receives the target rotation speed Nin* and actuates and controls the first actuator 356 and the second actuator 357 to make the rotation speed Nin of the input shaft 351 approach to the target rotation speed Ni*.

As described above, in the motor vehicle 320 of the second embodiment, the drive control sets the target rotation speed Ne* and the target torque Te* of the engine 22 by distributing the rotation speed Ni for in-cylinder injection and the rotation speed Np for port injection by the allocation rate k of fuel injection from the in-cylinder fuel injection valves 125 to fuel injection from the port fuel injection valves 126. Here the rotation speed Ni for in-cylinder injection is set according to the operation curve for in-cylinder injection in the operation of the engine 22 with fuel injection from only the in-cylinder fuel injection valves 125. The rotation speed Np for port injection is set according to the operation curve for port injection in the operation of the engine 22 with fuel injection from only the port fuel injection valves 126. The drive control of the motor vehicle 320 then sets the target rotation speed Ni* of the input shaft 351 and controls the engine 22 and the CVT 350 to drive the engine 22 at a specific drive point defined by the target rotation speed Ne* and the target torque Te* and to ensure output of the torque demand Tout* to the output shaft 352 or the driveshaft. This arrangement enables the engine 22 to be driven in the appropriate operating conditions and ensures output of the torque demand Tout* to the output shaft 352 even in the state of shared fuel injection from the in-cylinder fuel injection valves 125 and from the port fuel injection valves 126. When the fuel consumption-priority operation curves are set to the working operation curves, this arrangement enables efficient operation of the engine 22 and ensures output of the torque demand Tout* to the output shaft 352 even in the state of shared fuel injection from the in-cylinder fuel injection valves 125 and from the port fuel injection valves 126.

In the absence of the high torque request, the motor vehicle 320 of the second embodiment sets the fuel consumption-priority operation curves to both the working operation curve for in-cylinder injection and the working operation curve for port injection, sets the target rotation speed Ne* and the target torque Te* of the engine 22 according to the fuel consumption-priority operation curves, and controls the engine 22 and the CVT 350. In the presence of the high torque request, on the other hand, the motor vehicle 320 of the second embodiment sets the high torque operation curves to both the working operation curve for in-cylinder injection and the working operation curve for port injection, sets the target rotation speed Ne* and the target torque Te* of the engine 22 according to the high torque operation curves, and controls the engine 22 and the CVT 350. This arrangement enables the engine 22 to be driven in the appropriate operating conditions and ensures output of the torque demand Tout* to the output shaft 352 even in the state of shared fuel injection from the in-cylinder fuel injection valves 125 and from the port fuel injection valves 126 with a change of the constraint to set the drive point of the engine 22 in response to the high torque request.

In the motor vehicle 320 of the second embodiment, the belt CVT 350 is applied for the stepless speed change device. This belt CVT 350 may be replaced by a toroidal or any other continuous variable transmission.

In the motor vehicle 320 of the second embodiment, the drive control sets the target rotation speed Ne* of the engine 22 to the target rotation speed Ni* of the input shaft 351 and actuates and controls the first actuator 356 and the second actuator 357 to make the rotation speed Nin of the input shaft 351 approach to the target rotation speed Ni*. One modified flow of the drive control may set the target rotation speed Ne* of the engine 22 to the target rotation speed Ni* of the input shaft 351, divide the target rotation speed Ni* by the rotation speed Nout of the output shaft 352 to set a target gear ratio $\gamma^*$, and actuate and control the first actuator 356 and the second actuator 357 to attain the target gear ratio $\gamma^*$.

In the hybrid vehicle 20 of the first embodiment and the motor vehicle 320 of the second embodiment, the two constraints, that is, the fuel consumption-priority operation curves and the high torque operation curves, are provided as the possible operation curves for in-cylinder injection and the possible operation curves for port injection. The fuel consumption-priority operation curves and the high torque operation curves are selectively used as the working operation curves corresponding to the presence or the absence of the high torque request. One possible modification may provide three or more constraints of operation curves and selectively use these constraints of operation curves as the working operation curves upon satisfaction of different conditions. Another possible modification may provide only one constraint of operation curves, for example, fuel consumption-priority operation curves, and always use the fuel consumption-priority operation curves as the working operation curve for in-cylinder injection and the working operation curve for port injection.

In the hybrid vehicle 20 of the first embodiment and the motor vehicle 320 of the second embodiment, the drive control sets the target rotation speed Ne* and the target torque Te* of the engine 22 by distributing the rotation speed Ni for in-cylinder injection and the rotation speed Np for port injection by the allocation rate k of fuel injection from the in-cylinder fuel injection valves 125 to fuel injection from the port fuel injection valves 126. Here the rotation speed Ni for in-cylinder injection is set according to the operation curve for in-cylinder injection in the operation of the engine 22 with fuel injection from only the in-cylinder fuel injection valves 125. The rotation speed Np for port injection is set according to the operation curve for port injection in the operation of the engine 22 with fuel injection from only the port fuel injection valves 126. One modified flow of the drive control may set the target rotation speed Ne* and the target torque Te* of the engine 22 by distributing a first rotation speed N1 and a second rotation speed N2 by the allocation rate k of fuel injection from the in-cylinder fuel injection valves 125 to fuel injection from the port fuel injection valves 126. Here the first rotation speed N1 is set according to a first operation curve used in operation of the engine 22 with fuel injection from the in-cylinder fuel injection valves 125 and fuel injection from the port fuel injection valves 126 at a preset first allocation rate, for example, 0.1. The second rotation speed N2 is set according to a second operation curve used in operation of the engine 22 with fuel injection from the in-cylinder fuel injection valves 125 and fuel injection from the port fuel injection valves 126 at a preset second allocation rate, for example, 0.9.

In the hybrid vehicle 20 of the first embodiment and the motor vehicle 320 of the second embodiment, the drive control sets the target rotation speed Ne* and the target torque Te* of the engine 22 by distributing the rotation speed Ni for in-cylinder injection and the rotation speed Np for port injection by the allocation rate k of fuel injection from the in-cylinder fuel injection valves 125 to fuel injection from the port fuel injection valves 126. Here the rotation speed Ni for in-cylinder injection is set according to the operation curve for in-cylinder injection in the operation of the engine 22 with fuel injection from only the in-cylinder fuel injection valves 125. The rotation speed Np for port injection is set according to the operation curve for port injection in the operation of the engine 22 with fuel injection from only the port fuel injection valves 126. Any other technique may be applied to compute the target rotation speed Ne* and the target torque Te* of the engine 22 from the rotation speed Ni for in-cylinder injection, the rotation speed Np for port injection, and the allocation rate k. For example, the target rotation speed Ne* and the target torque Te* of the engine 22 may be set by distributing the rotation speed Ni for in-cylinder injection and the rotation speed Np for port injection by the allocation rate k with weighting factors of in-cylinder injection and port injection. In another example, the target rotation speed Ne* and the target torque Te* of the engine 22 may be set by distributing the rotation speed Ni for in-cylinder injection and the rotation speed Np for port injection by a modified allocation rate, which is obtained by slow grading the allocation rate k.

In the hybrid vehicle 20 of the first embodiment and the motor vehicle 320 of the second embodiment, the power-driven high-pressure fuel pump 64 is used to apply a pressure to the supply of fuel through the delivery pipe 66. A mechanically-driven high-pressure fuel pump by the crankshaft 26 of the engine 22 or by a camshaft linked with the crankshaft 26 may be used alternatively to apply a pressure to the supply of fuel through the delivery pipe 66.

The technique of the invention is applicable to any vehicle or automobile that is equipped with the engine 22 having both the in-cylinder fuel injection valves 125 and the port fuel injection valves 126 and has a torque transmission device or mechanism of converting the output power of the engine 22 driven at an arbitrary drive point by torque conversion and transmitting the converted power to an axle, as described in the first embodiment and the second embodiment. The invention is not restricted to such vehicles or automobiles. The power output apparatus equipped with the engine 22 having both the in-cylinder fuel injection valves 125 and the port fuel injection valves 126 and with the torque transmission device or mechanism may be mounted on any other moving bodies including train cars, ships, boats, and aircraft and may be incorporated in stationary equipment. The technique of the invention is not restricted to the power output apparatus or the vehicle but may be actualized as a control method of the power output apparatus or a control method of the vehicle.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2005-186678 filed Jun. 27, 2005 including specification, drawings and claims is incorporated herein by reference in its entirety.

What is claimed is:

1. A power output apparatus that outputs power to a driveshaft, said power output apparatus comprising:
   an internal combustion engine that outputs power and has an in-cylinder fuel injection valve for injecting a fuel into a cylinder and a port fuel injection valve for injecting the fuel in an intake port;
   a torque conversion unit that converts the output power of the internal combustion engine by torque conversion and transmits the converted power to the driveshaft;
   a target driving force setting module that sets a target driving force to be output to the driveshaft;
   a target power setting module that sets a target power to be output from the internal combustion engine, based on the set target driving force;
   a target operating state setting module that sets a target operating state of the internal combustion engine, based on the set target power, a specified allocation rate of fuel injection from the in-cylinder fuel injection valve to fuel injection from the port fuel injection valve, a first constraint, and a second constraint, where the first constraint is imposed on an operating state of the internal combustion engine with shared fuel injection from the in-cylinder fuel injection valve and from the port fuel injection valve at a predetermined first allocation rate, and the second constraint is imposed on the operating state of the internal combustion engine with shared fuel injection from the in-cylinder fuel injection valve and from the port fuel injection valve at a predetermined second allocation rate different from the first allocation rate; and
   a control module that controls the internal combustion engine and the torque conversion unit to drive the internal combustion engine in the target operating state with fuel injection at the specified allocation rate and to ensure output of the target driving force to the driveshaft.

2. A power output apparatus in accordance with claim 1, wherein said target operating state setting module sets the target operating state of the internal combustion engine by distributing a first operating state and a second operating state of the internal combustion engine by a ratio of the specified allocation rate to the predetermined first allocation rate and a ratio of the specified allocation rate to the predetermined second allocation rate, where the first operating state of the internal combustion engine is set based on the first constraint and the target power and the second operating state of the internal combustion engine is set based on the second constraint and the target power.

3. A power output apparatus in accordance with claim 1, wherein the first constraint regards operation of the internal combustion engine with fuel injection from only the in-cylinder fuel injection valve, and the second constraint regards operation of the internal combustion engine with fuel injection from only the port fuel injection valve.

4. A power output apparatus in accordance with claim 1, wherein the torque conversion unit is a continuously variable transmission, and said control module varies a change gear ratio of the torque conversion unit to drive and rotate the internal combustion engine at a rotation speed specified by the set target operating state.

5. A power output apparatus in accordance with claim 1, wherein each of the first constraint and the second constraint includes multiple restrictions with regard to multiple conditions, and said target operating state setting module sets the target operating state of the internal combustion engine, based on a certain restriction included in the first constraint and a corresponding restriction included in the second constraint with regard to a selected condition among the multiple conditions.

6. A power output apparatus in accordance with claim 5, wherein the multiple restrictions include at least one of an efficient operation restriction for efficient operation of the internal combustion engine and a high torque output restriction for output of a high torque from the internal combustion engine.

7. A power output apparatus in accordance with claim 1, wherein the torque conversion unit comprises:

an electric power-mechanical power input output mechanism that is connected to an output shaft of the internal combustion engine and to the driveshaft and outputs at least part of the output power of the internal combustion engine to the driveshaft through input and output of electric power and mechanical power;

a motor that inputs and outputs power from and to the driveshaft; and an accumulator unit that receives and transmits electric power from and to the electric power-mechanical power input output mechanism and the motor, wherein said control module controls the internal combustion engine, the electric power-mechanical power input output mechanism, and the motor to drive the internal combustion engine in the target operating state and to ensure output of a driving force equivalent to the target driving force to the driveshaft.

8. A power output apparatus in accordance with claim 7, wherein the electric power-mechanical power input output mechanism comprises:

a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

9. A vehicle, said vehicle comprising:

an internal combustion engine that outputs power and has an in-cylinder fuel injection valve for injecting a fuel into a cylinder and a port fuel injection valve for injecting the fuel in an intake port;

a torque conversion unit that converts the output power of the internal combustion engine by torque conversion and transmits the converted power to the driveshaft connected to an axle;

a target driving force setting module that sets a target driving force to be output to the driveshaft;

a target power setting module that sets a target power to be output from the internal combustion engine, based on the set target driving force;

a target operating state setting module that sets a target operating state of the internal combustion engine, based on the set target power, a specified allocation rate of fuel injection from the in-cylinder fuel injection valve to fuel injection from the port fuel injection valve, a first constraint, and a second constraint, where the first constraint is imposed on an operating state of the internal combustion engine with shared fuel injection from the in-cylinder fuel injection valve and from the port fuel injection valve at a predetermined first allocation rate, and the second constraint is imposed on the operating state of the internal combustion engine with shared fuel injection from the in-cylinder fuel injection valve and from the port fuel injection valve at a predetermined second allocation rate different from the first allocation rate; and a control module that controls the internal combustion engine and the torque conversion unit to drive the internal combustion engine in the target operating state with fuel injection at the specified allocation rate and to ensure output of the target driving force to the driveshaft.

10. A vehicle in accordance with claim 9, wherein said target operating state setting module sets the target operating state of the internal combustion engine by distributing a first operating state and a second operating state of the internal combustion engine by a ratio of the specified allocation rate to the predetermined first allocation rate and a ratio of the specified allocation rate to the predetermined second allocation rate, where the first operating state of the internal combustion engine is set based on the first constraint and the target power and the second operating state of the internal combustion engine is set based on the second constraint and the target power.

11. A vehicle in accordance with claim 9, wherein each of the first constraint and the second constraint includes multiple restrictions with regard to multiple conditions, and said target operating state setting module sets the target operating state of the internal combustion engine, based on a certain restriction included in the first constraint and a corresponding restriction included in the second constraint with regard to a selected condition among the multiple conditions.

12. A vehicle in accordance with claim 9, wherein the first constraint regards operation of the internal combustion engine with fuel injection from only the in-cylinder fuel injection valve, and the second constraint regards operation of the internal combustion engine with fuel injection from only the port fuel injection valve.

13. A vehicle in accordance with claim 9, wherein the torque conversion unit is a continuously variable transmission, and said control module varies a change gear ratio of the torque conversion unit to drive and rotate the internal combustion engine at a rotation speed specified by the set target operating state.

14. A vehicle in accordance with claim 9, wherein the torque conversion unit comprises:

an electric power-mechanical power input output mechanism that is connected to an output shaft of the internal combustion engine and to the driveshaft and outputs at least part of the output power of the internal combustion engine to the driveshaft through input and output of electric power and mechanical power;

a motor that inputs and outputs power from and to the driveshaft; and an accumulator unit that receives and transmits electric power from and to the electric power-mechanical power input output mechanism and the motor, wherein said control module controls the internal combustion engine, the electric power-mechanical power input output mechanism, and the motor to drive the internal combustion engine in the target operating state and to ensure output of a driving force equivalent to the target driving force to the driveshaft.

15. A vehicle in accordance with claim 14, wherein the electric power-mechanical power input output mechanism comprises:

a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

16. A control method of a power output apparatus, said power output apparatus comprising: an internal combustion engine that outputs power and has an in-cylinder fuel injection valve for injecting a fuel into a cylinder and a port fuel injection valve for injecting the fuel in an intake port; and a torque conversion unit that converts the output power of the internal combustion engine by torque conversion and transmits the converted power to a driveshaft, said control method comprising the steps of:

(a) setting a target driving force to be output to the driveshaft, and setting a target power to be output from the internal combustion engine based on the set target driving force;

(b) setting a target operating state of the internal combustion engine, based on the set target power, a specified allocation rate of fuel injection from the in-cylinder fuel injection valve to fuel injection from the port fuel injection valve, a first constraint, and a second constraint, where the first constraint is imposed on an operating state of the internal combustion engine with shared fuel injection from the in-cylinder fuel injection valve and from the port fuel injection valve at a predetermined first allocation rate, and the second constraint is imposed on the operating state of the internal combustion engine with shared fuel injection from the in-cylinder fuel injection valve and from the port fuel injection valve at a predetermined second allocation rate different from the first allocation rate; and (c) controlling the internal combustion engine and the torque conversion unit to drive the internal combustion engine in the target operating state with fuel injection at the specified allocation rate and to ensure output of the target driving force to the driveshaft.

17. A control method of a power output apparatus in accordance with claim 16, wherein said step (b) sets the target operating state of the internal combustion engine by distributing a first operating state and a second operating state of the internal combustion engine by a ratio of the specified allocation rate to the predetermined first allocation rate and a ratio of the specified allocation rate to the predetermined second allocation rate, where the first operating state of the internal combustion engine is set based on the first constraint and the target power and the second operating state of the internal combustion engine is set based on the second constraint and the target power.

18. A control method of a power output apparatus in accordance with claim 16, wherein each of the first constraint and the second constraint includes multiple restrictions with regard to multiple conditions, and said step (b) sets the target operating state of the internal combustion engine, based on a certain restriction included in the first constraint and a corresponding restriction included in the second constraint with regard to a selected condition among the multiple conditions.

19. A control method of a power output apparatus in accordance with claim 16, wherein the first constraint regards operation of the internal combustion engine with fuel injection from only the in-cylinder fuel injection valve, and the second constraint regards operation of the internal combustion engine with fuel injection from only the port fuel injection valve.

* * * * *